(12) United States Patent
Ushiyama et al.

(10) Patent No.: US 8,542,690 B2
(45) Date of Patent: Sep. 24, 2013

(54) INFORMATION COMMUNICATION SYSTEM, INFORMATION COLLECTION METHOD, NODE DEVICE, AND RECORDING MEDIUM

(75) Inventors: Kentaro Ushiyama, Nagoya (JP); Yuji Kiyohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 720 days.

(21) Appl. No.: 12/230,150

(22) Filed: Aug. 25, 2008

(65) Prior Publication Data

US 2009/0003357 A1 Jan. 1, 2009

Related U.S. Application Data

(63) Continuation-in-part of application No. PCT/JP2007/050096, filed on Jan. 9, 2007.

(30) Foreign Application Priority Data

Feb. 27, 2006 (JP) ................................. 2006-051159

(51) Int. Cl.
*H04L 12/56* (2011.01)
(52) U.S. Cl.
USPC ..................... 370/400; 370/390; 370/395.54
(58) Field of Classification Search
USPC .......................................................... 370/390
See application file for complete search history.

(56) References Cited

U.S. PATENT DOCUMENTS

| 7,668,185 B2 | 2/2010 | Hibino et al. | |
| 2004/0054807 A1 | 3/2004 | Harvey et al. | |
| 2004/0252690 A1* | 12/2004 | Pung et al. | 370/390 |
| 2005/0129017 A1* | 6/2005 | Guingo et al. | 370/390 |
| 2005/0243740 A1 | 11/2005 | Chen et al. | |
| 2007/0130314 A1 | 6/2007 | Hibino et al. | |

FOREIGN PATENT DOCUMENTS

| JP | A-2000-49822 | 2/2000 |
| JP | A-2002-344477 | 11/2002 |
| JP | A-2004-266796 | 9/2004 |
| JP | A-2005-353039 | 12/2005 |
| JP | A-2006-33115 | 2/2006 |

OTHER PUBLICATIONS

El-Ansary et al., "Efficient Broadcast in Structured P2P Networks", 2nd International Workshop on Peer-to-Peer Systems (IPTPS 2003), 2003, Section 4.2.
Zhao et al., "Tapestry: An Infrastructure for Fault-tolerant Wide-area Location and Routing", Technical Report UCB/CSD-1-1141, 2001.
Jun. 22, 2010 Office Action issued in Japanese Patent Application No. 2006-051159 (with translation).

* cited by examiner

*Primary Examiner* — Hassan Kizou
*Assistant Examiner* — Tejis Daya
(74) *Attorney, Agent, or Firm* — Oliff & Berridge PLC.

(57) ABSTRACT

An information communication system has features that efficient transmission of information to plural node devices can be carried out without a managing server, etc. and efficient collection of responses from the node devices can be carried out while suppressing loads imposed on a network. The information communication system has a means for receiving an information collection message from other node devices to the group, a means for transmitting an information collection message to one of the node devices in each of the groups when the group is further divided into plural groups, a means for receiving reply messages including response information, a means for generating new response information based on the response information in the reply message and its own response information, and a means for sending reply messages including the new response information to the other node devices.

8 Claims, 17 Drawing Sheets

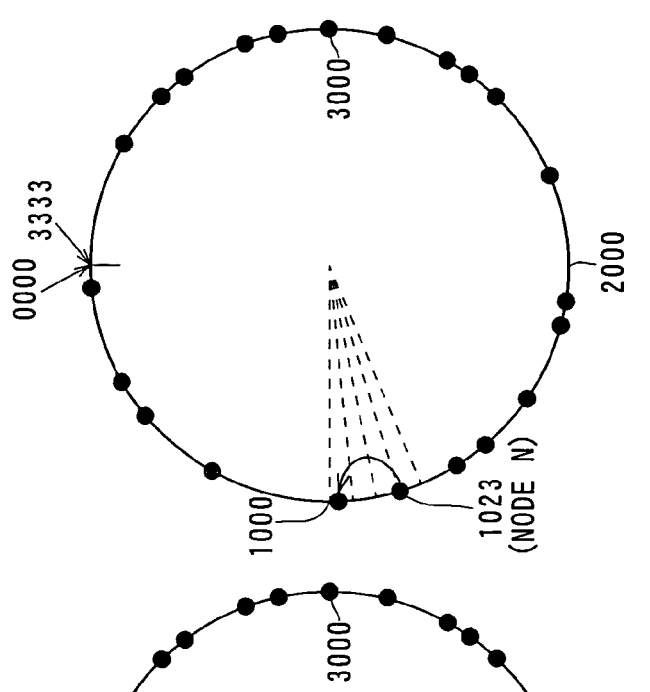
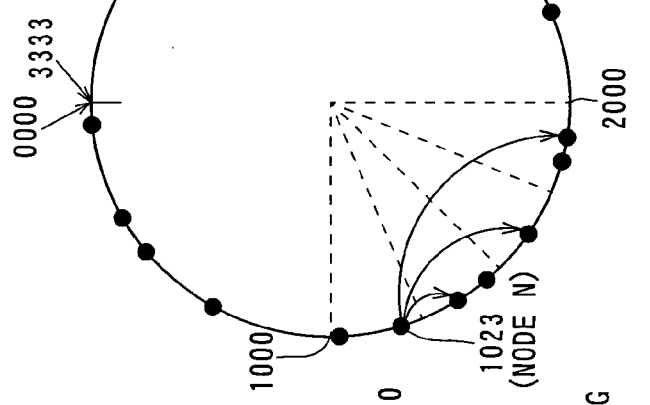
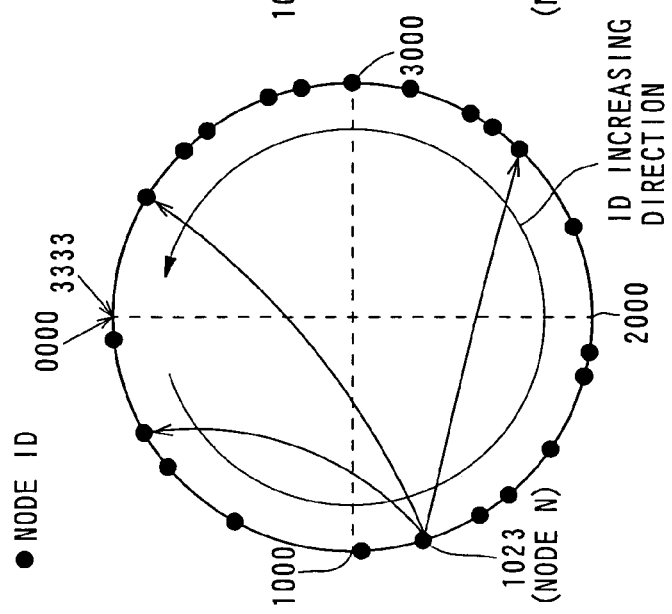

FIG. 3A

| 0130 | 1023 | 2203 | 3220 |
|---|---|---|---|
| IP ADDRESS 0 | — | IP ADDRESS 2 | IP ADDRESS 3 |

FIG. 3B

| 1023 | 1132 | 1202 | 1321 |
|---|---|---|---|
| — | IP ADDRESS 4 | IP ADDRESS 5 | IP ADDRESS 6 |

FIG. 3C

| 1000 | — | 1023 | — |
|---|---|---|---|
| IP ADDRESS 7 | — | — | — |

FIG. 3D

| | ATTENTION DIGIT 0 RESPECTIVELY IN LEVEL | ATTENTION DIGIT 1 RESPECTIVELY IN LEVEL | ATTENTION DIGIT 2 RESPECTIVELY IN LEVEL | ATTENTION DIGIT 3 RESPECTIVELY IN LEVEL |
|---|---|---|---|---|
| LEVEL 1 | 0130 | 1023 | 2203 | 3220 |
| | IP ADDRESS 0 | — | IP ADDRESS 2 | IP ADDRESS 3 |
| LEVEL 2 | 1023 | 1132 | 1202 | 1321 |
| | — | IP ADDRESS 4 | IP ADDRESS 5 | IP ADDRESS 6 |
| LEVEL 3 | 1000 | — | 1023 | — |
| | IP ADDRESS 7 | — | — | — |
| LEVEL 4 | — | — | — | 1023 |
| | — | — | — | — |

FIG. 5

|  |  | ATTENTION DIGIT X=0 RESPECTIVELY IN LEVEL | ATTENTION DIGIT X=1 RESPECTIVELY IN LEVEL | ATTENTION DIGIT X=2 RESPECTIVELY IN LEVEL | ATTENTION DIGIT X=3 RESPECTIVELY IN LEVEL |
|---|---|---|---|---|---|
| LEVEL 1 | X*** | 0132 | 1001 | 2120 | 3102 |
|  |  | NODE A | NODE B | NODE C | — |
| LEVEL 2 | 3X** | 3001 | 3102 | 3232 | 3311 |
|  |  | NODE D | — | NODE E | NODE F |
| LEVEL 3 | 31X* | 3102 | — | 3123 | 3130 |
|  |  | — | — | NODE G | NODE H |
| LEVEL 4 | 310X | — | — | 3102 | 3103 |
|  |  | — | — | — | NODE J |

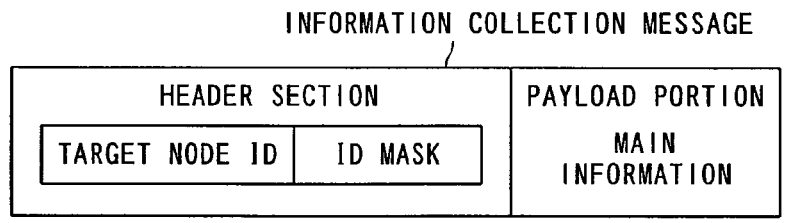

FIG. 6A — INFORMATION COLLECTION MESSAGE: HEADER SECTION (TARGET NODE ID | ID MASK) | PAYLOAD PORTION (MAIN INFORMATION)

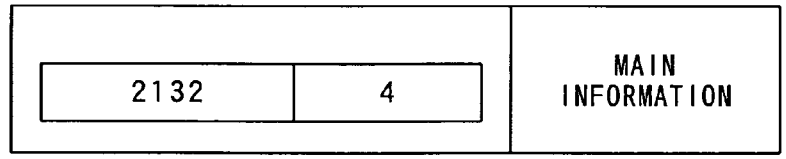

FIG. 6B — 2132 | 4 | MAIN INFORMATION

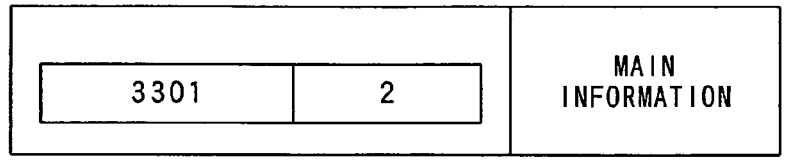

FIG. 6C — 3301 | 2 | MAIN INFORMATION

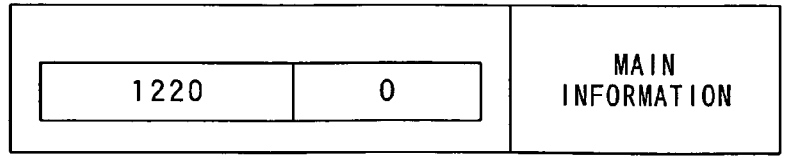

FIG. 6D — 1220 | 0 | MAIN INFORMATION

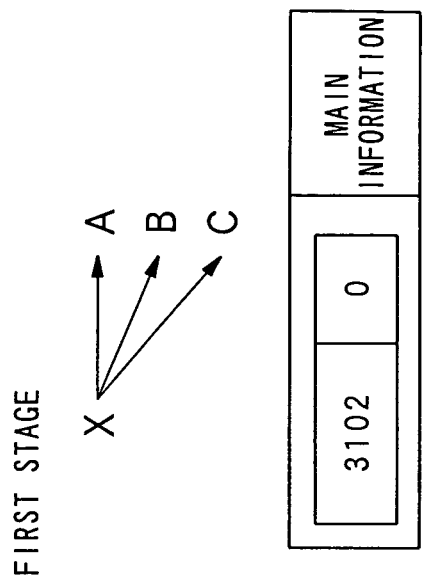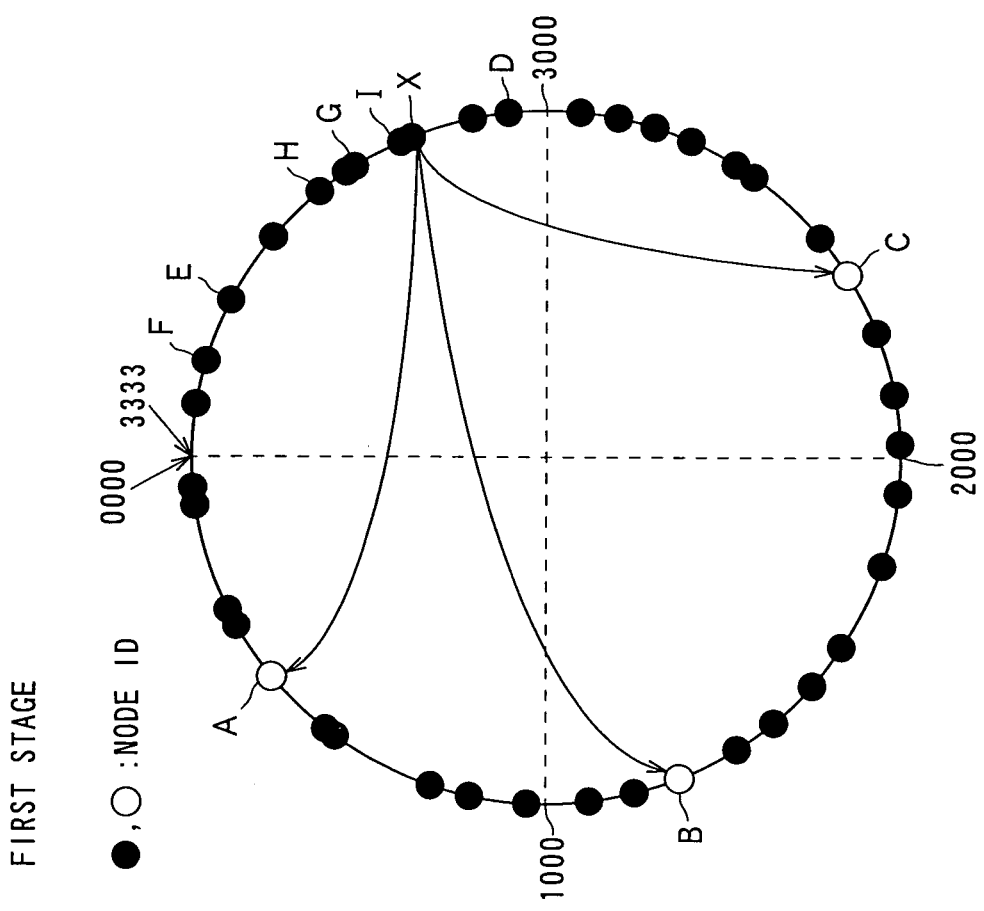

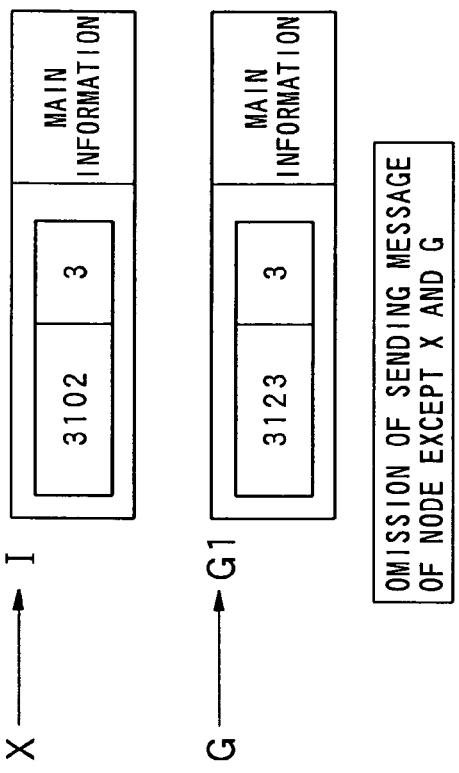
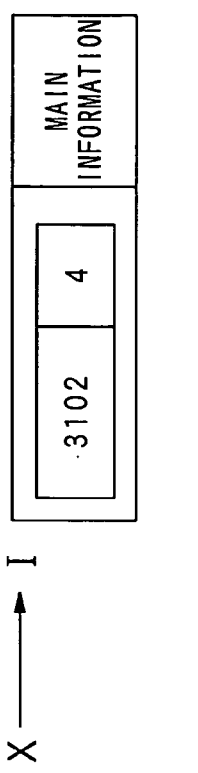
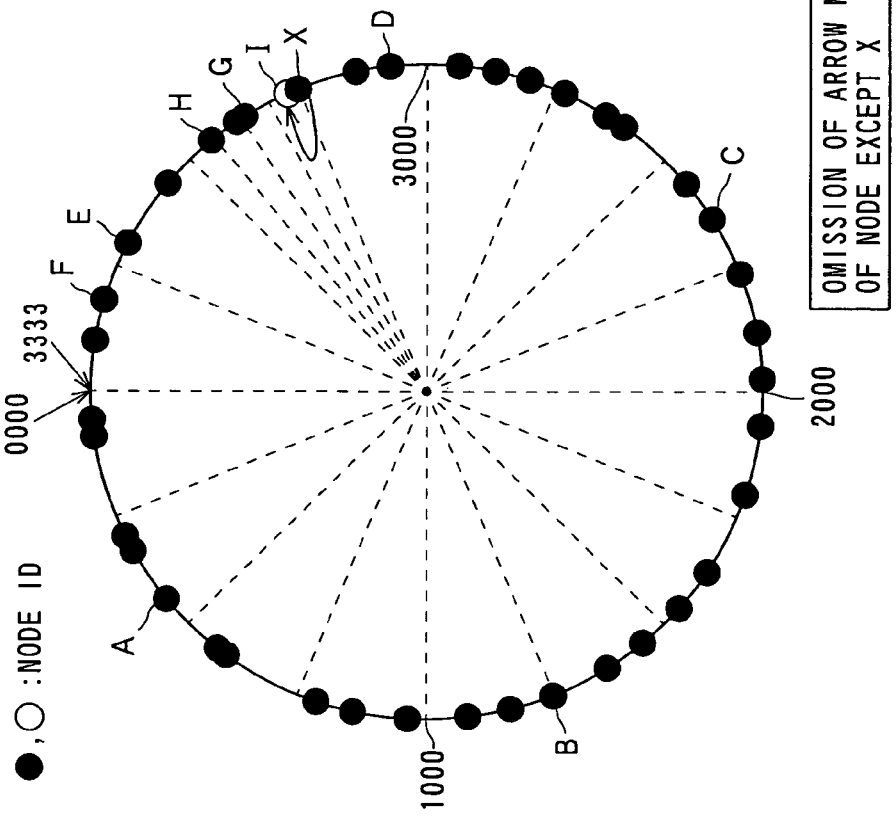

INFORMATION COMMUNICATION SYSTEM, INFORMATION COLLECTION METHOD, NODE DEVICE, AND RECORDING MEDIUM

The entire disclosures of Japanese Patent Application No. 2006-051159 filed on Feb. 27, 2006 including the specification, claims, drawings and summary are incorporated herein by reference in its entirety.

BACKGROUND OF THE INVENTION

1. Field of the Invention

The present invention relates to a peer-to-peer (P2P) type information communication system and the like including a plurality of node devices enabled to mutually communicate through a network, wherein the plural node devices are divided into several groups in conformity with a predetermined rule.

2. Discussion of the Related Art

As a method of sending identical information to plural peripheral devices (clients) connected to a network such as the internet, it is ordinary that a device of information sending source (e.g. server) duplicates the information as many as number of peripheral devices of information sending destination and sends the information thus duplicated to respective peripheral devices.

Meanwhile, for example, in an IP (internet protocol) multicast art disclosed in Patent Document 1, a piece of information sent from a device of information sending source (e.g. server) is duplicated at respective routers (bifurcation of destination) corresponding to the plural peripheral devices of information sending source and sent to respective peripheral devices, thereby reducing load on the device of information sending source.

Further as disclosed in Patent Document 2, it is also known that plural peripheral devices are divided into groups, each of the groups is provided with a group management server, and a piece of information is sent to respective groups, whereby the information is sent to all peripheral devices belonging to the respective groups.

Patent Document 1: Japanese Unexamined Patent Publication No. 2000-49822
Patent Document 2: Japanese Unexamined Patent Publication No. 2002-344477

SUMMARY OF THE INVENTION

Meanwhile, an art of peer-to-peer has been paid attention to recently. With respect to such a peer-to-peer type information communication system, in an overlay network logically built using a distributed hash table (hereinafter referred to as DHT), each node device does not recognize link information (e.g. IP address) to all the node devices participating in the overlay network but holds only link information for a portion of node devices obtained at the time of participation, and inquiry and the like about information are made based on such the link information.

For this reason, it is difficult that information is duplicated for example in a certain node device and the duplicated information is sent to all the node devices participating in the overlay network.

Further, although it is possible to send information to all the node devices participating in the overlay network using the above-mentioned IP multicast art, there is a problem that all the routers in the path of information to be sent should correspond to the IP multicast function.

Further, although it is also possible that the plural node devices participating in the overlay network are divided into groups, respective groups are provided with the management server, and information is sent to the node device belonging to an own group managed by a management server of respective groups, there are problems of cost and management.

On the other hand, in the conventional technique, even in a case where information is sent to all the node devices participating in the overlay network, it is difficult to efficiently collect responses from respective node devices without applying load on the network.

The present invention is made in view of the above problems, and an object of the present invention is to provide an information communication system, an information collection method, a node device, and a recording medium, which are enable to send information to plural node devices more efficiently without using a management server and the like and enable to efficiently collect replies from the plural node devices while suppressing load on the network.

To solve the above problem, according to a first aspect of the present invention, there is provided a node device in an information communication system including a plurality of node devices which are enabled to mutually communicate through a network, wherein the plurality of node devices are divided into a plurality of groups in conformity with a predetermined rule,
the node device including:
an information collection message receiving means for receiving an information collection message bound for the group which an own node belongs to and which is sent from another node device;
an information collection message sending means for determining, in a case where the group which the own belongs to is thus further divided into a plurality of groups in conformity with the predetermined rule, a node device one belonging to each of the plurality of groups thus further divided and for sending the information collection message thus received to all the node devices thus determined;
a return message receiving means for receiving a return message including response information to thus received information collection message which is returned from all or a part of thus determined node devices;
a response information generation means for generating new response information based on response information included in thus received return message and own response information to thus received information collection message; and
a return message returning means for returning the return message including the new response information thus generated to the other node device.

According to the invention, in a case where the node device one receives information collection message corresponding to the group where the own node belongs and the group where the own node belongs is further divided into a plurality of groups in conformity with a predetermined rule, the node one belonging to the groups are thus further divided is determined, and information collection message which is received by the all node devices thus determined are sent. It is constructed such that the node device one receives the return message including the reply information with respect to the information collection message thus received, generates new reply information based on the reply information included in the reply message thus received and the own reply information with respect to the information collection message thus received, and the reply message including the new reply information thus generated is returned to the other node. Therefore, it is possible to more efficiently send the information collection message to a plurality of node devices and more efficiently collect a reply from the plurality of node devices while suppressing a load on the network.

According to the present invention, a node device 1 receives an information collection message, sent from the other node device and bound for the group to which an own node belongs. In a case where the group to which the own node belongs is further divided into plural groups in conformity with the predetermined rule, one node device which belongs to the respective groups thus further divided is determined, and the information collection message thus received is sent to all the node devices thus determined. Then the node device 1 receives a return message including response information to thus received information collection message which is returned entirely or partially from the determined node devices, generates new response information based on the response information included in the received return message and own response information to the received information collection message, returns the return message including the new response information thus generated to the other node device. Because of such the configuration, the information collection message can be efficiently sent to plural node devices without using the management server and the like, and the responses can be more efficiently collected from the plural node devices while reducing load on the network.

BRIEF DESCRIPTION OF THE DRAWINGS

FIG. 2 is a A view showing an example of a state where a routing table is made.

FIG. 3 is a view showing an example of the rouging table.

FIG. 5 is an example of a routing table retained by a node X.

FIG. 6 is a schematic view showing an information collection message.

FIG. 7 is a view showing a state where DHT multicast is carried out.

FIG. 10 is a view showing a state where DHT multicast is carried out.

DETAILED DESCRIPTION OF THE PREFERRED EMBODIMENTS

Figure 1:
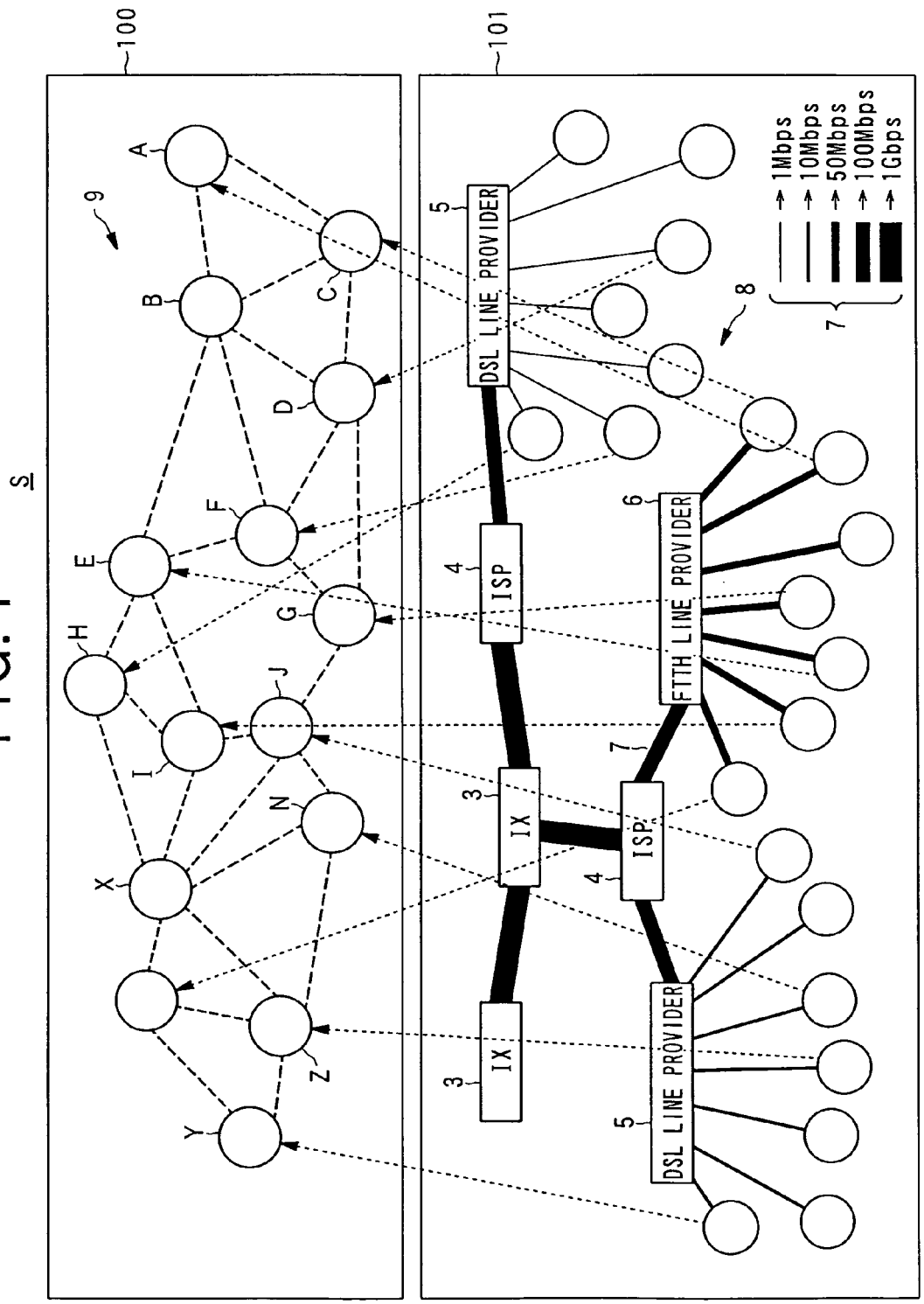
FIG. 1 is a view showing an example of connection mode of respective node devices in an information communication system according to the present embodiment.

Each designation of numerical reference in the drawings is typically as follows:
A to Z: Node;
8: Network;
9: Overlay network;
11: Control unit;
12: Memory unit;
13: Buffer memory;
14: Decoder;
15: Image processing unit;
16: Display unit;
17: Audio processing unit;
18: Speaker;
20: Communication unit;
21: Input unit;
22: Bus; and
S: Information communication system.

Hereinafter, embodiments of the present invention will be described in reference of drawings. Here, the embodiments explained below are embodiments wherein the present invention is applied to an information communication system sending various information to the node device using DHT (Distributed Hash Table).

[1. Configuration and the Like of Information Communication System]

First, with reference to FIG. 1, schematic configuration and the like of an information communication system is described.

FIG. 1 is a view showing an example of connection status of respective node devices in an information communication system according to the present embodiment.

As shown in a lower frame 101 of FIG. 1, a network (communication network in real world) 8 of the Internet or the like is constructed by an internet exchange (IX) 3, internet service providers (ISP) 4, digital subscriber line (DSL) providers (or device thereof) 5, fiber to the home line provider (or device thereof) 6, and communication line (e.g. a phone line or an optical cable) 7 and the like. Here, in the network (a communication network) 8 of the example of FIG. 1, a router for transferring message (packet) is appropriately inserted (not shown in the figures).

The information communication system S is provided with a plurality of node devices (hereinafter referred to as "node") A, B, C, . . . X, Y, Z . . . which are mutually connected through such the network 8, and the system is a peer to peer network system. Further, a unique manufacturing number and an IP (Internet Protocol) address as addressed information are allocated to each of the nodes A, B, C, . . . X, Y, Z . . . . The manufacturing numbers and IP addresses do not overlap among plural nodes.

Next, algorithm using a distributed hash table (hereinafter referred to as "DHT") related to the present embodiment is described.

In the above-mentioned information communication system S, the nodes should know an IP address or the like with each other when the nodes exchange information with each other.

For example, in a system in which contents are shared with each other, it is a simple method that respective nodes participating in the network 8 know IP addresses of all the nodes participating in the network 8. However, it is not realistic to memorize IP addresses of all the nodes when the number of terminals becomes numerous, tens of thousands or hundreds of thousands. Further, when arbitrary nodes turn on or off, operation becomes difficult because updating IP addresses of the arbitrary nodes memorized in the respective nodes becomes frequent.

Then, there is devised a system where a unit of node memorizes only IP addresses of the necessary minimum nodes among all the nodes participating in the network 8. With respect to a node of unknown (not memorized) IP address, information is mutually transferred and delivered among respective nodes.

As an example of such the system, an overlay network 9 is configured by an algorithm using DHT as shown in an upper frame 100 of FIG. 1. That is, this overlay network 9 means a network configuring a virtual link formed by use of an existing network 8.

The present embodiment is premised on an overlay network 9 configured by an algorithm using DHT. Nodes arranged on this overlay network 9 are referred to as a node participating in the overlay network 9. Here, participation in the overlay network 9 is done when a node not yet participating sends a participation request to an arbitrary one among the already participating nodes.

The respective nodes have a node ID as unique identification information, and the node ID is a hash value obtained by hashing for example IP addresses or manufacturing numbers with a common hash function (e.g. SHA-1), whereby nodes are distributed and located in one ID space without deviation. It is required for the node ID to have a bit number enough to include maximum operation number of nodes. For example, when the number is a 128-bit number, the node can operate $2^{128}=340 \times 10^{36}$ nodes.

As described above, the node ID obtained by a common hash function has very low possibility of having the same value if the IP address or the manufacturing number differs. Here, because the hash function is well known, detailed explanation thereof is omitted.

Next, an example of a method of making a routing table being content of DHT will be explained with reference to FIGS. 2 and 3.

FIG. 2 is a view showing an example that a routing table is made. FIG. 3 is a view showing an example of routing table.

Since the nodes ID given to respective nodes are generated using a common hash function, they are considered to be dispersed and located in identical ring-shape ID space without much deviation as shown in FIGS. 2(A) and 2(B). The figures are provided with ID nodes at 8 bits and illustrated. In the figures, a black dot indicates a node ID, and ID increases counterclockwise.

First, as shown in FIG. 2(A), the ID space is divided (split) into several areas (as groups) in conformity with the predetermined rule. In practice, about 16-area division is often used. For easy of explanation, ID is expressed by quaternary number of a bit length of 8 bits. Then a node ID of a node N is set up to be "1023". An example of making a routing table of this node N will be explained.

(Routing of Level 1)

When the ID space is divided in quarters, and each area divided in quarters has different maximum digit, "0XXX", "1XXX", "2XXX", and "3XXX" (X being integer number of 1 to 3, hereinafter similar to the above) when expressed by quaternary number. Since the node ID of the node N itself is "1023", it is located in the area "1XXX" at the lower left of the figure. Then the node N appropriately selects respective nodes located in an area except for the area (i.e. an area "1XXX") where the own node exists, and registers (memorizes) IP address or the like of the node ID (actually, also inclusive of port number, hereinafter similar to the above) in respective entries (table entries) of the table of level 1. FIG. 3(A) is an example of the table of level 1. Here, since the second entry in the table of level 1 indicates the node N itself, it is unnecessary to register the IP address or the like.

(Routing of Level 2)

Next, as shown in FIG. 2(B), the area where the own exists among the areas thus divided in quarters by the routing is further divided in quarters to obtain four areas "10XX", "11XX", "12XX", and "13XX". Then in a manner similar to the above, respective nodes existing in an area except for the area where the own exists are appropriately selected, and an IP address or the like of the node ID are registered in respective columns (table entries) in a table of level 2. FIG. 3(B) is an example of the table of level 2. Here since a first entry of the table of level 2 indicates the node N itself, the IP address or the like is unnecessary to be registered.

(Routing of Level 3)

Next as shown in FIG. 2(C), the area, where the own node exists, among the areas thus divided in quarters by the routing is further divided in quarters into four areas "100X", "101X", "102X", and "103X". Then, in a manner similar to the above, respective nodes existing in an area except for the area where the own exists are appropriately selected, and an IP address or the like of the node ID are registered in respective entries (table entries) in a table of level 3. FIG. 3(C) is an example of the table of level 3. Here, since a third entry of the table of level 3 indicates the node N itself, the IP address or the like is not necessary to be registered, and a second entry and a fourth entry are blank because no node exists in the area.

In such a way, routing tables are configured up to level 4 as shown in FIG. 3(D) to thereby cover 8-bit IDs in entirety. Blank in the table becomes conspicuous as the level increases.

All the nodes respectively made in conformity with the above-mentioned methods (rules) are respectively made and owned by all nodes. The respective nodes memorize the IP address or the like as addressed information of the other nodes, and the area of the node ID space as a group, in other words, respective levels and respective lines of DHT in correspondence with one another. In other words, the respective nodes is stipulated as a first stage (level) by correlating the IP addresses or the like of the node one respectively belonging to each area, obtained by dividing into plural areas. Further, the area where the own node belongs is divided into a plurality of areas. The node device memorizes a routing table stipulating an IP address or the like of the node one belonging to each area thus divided, as a next stage (level) in correspondence with the areas respectively.

Here, number of levels is determined in response to number of digits of the node ID, and the number of attention digits of respective levels in FIG. 3(D) is determined in response to number of base numbers. Specifically, ID is 64 bits and the number of alpha-numeral of attention digits in level 16 is 0 to f in the case of 16 digits hexadecimal number. In explanation of the routing table described below, a portion indicative of number of attention digits in respective levels is also simply referred to as "column".

[2. Configuration and the Like of Node]

Next, with reference to FIG. 4, configuration and function of a node will be explained. Here, although nodes function as a node first sending information (message) through processes carried out by respective nodes and as a node transferring received information (message), the configuration thereof is the same.

Figure 4:
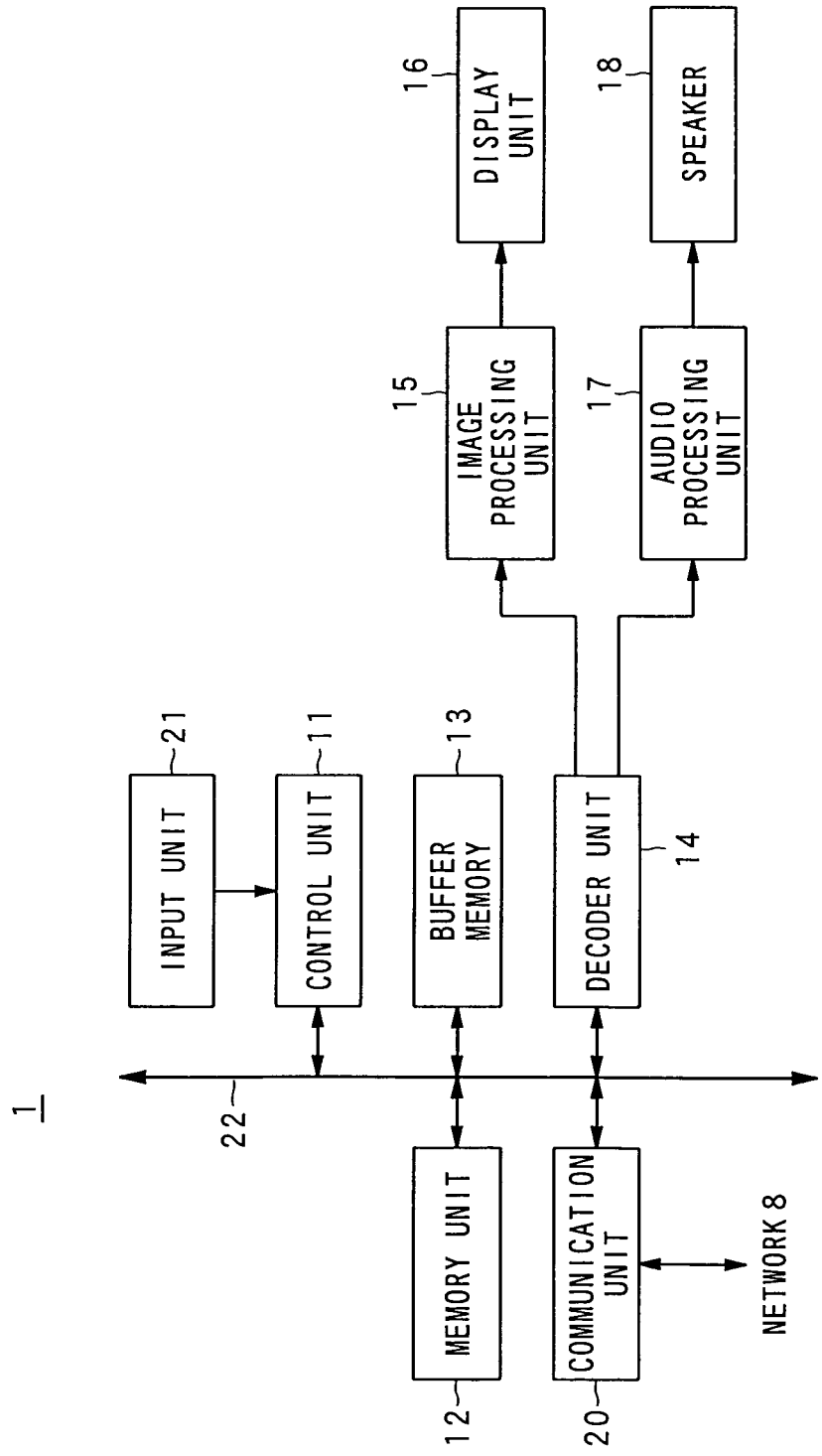
FIG. 4 is a view showing an example of a schematic configuration of node.

FIG. 4 is a view showing an example of a schematic configuration of a node.

The respective nodes are configured by including, as shown in FIG. 4: a control unit 11 being a computer configured by a CPU having computing function, a RAM for work, and a ROM for memorizing various data and programs; a memory unit 12 as a memory means configured by an HD or the like for memorizing and storing content data, the above-mentioned routing tables, various types of programs or the like; a buffer memory 13 for temporarily storing received content data and the like; a decoder 14 for decoding (stretching data or decrypt) encoded video data (image information) and audio data (voice information) included in the content data; an image processing unit 15 for providing a predetermined graphic process to the video data thus decoded or the like and outputting the data as a video signal; a display unit 16 such as CRT or liquid crystal display for displaying image based on the video signal outputted from the image processing unit 15; an audio processing unit 17 for converting the decoded audio data in use of digital/analog (D/A) conversion into an analog audio signal, amplifying the converted signal by an amplifier and outputting the same; a speaker 18 for outputting the audio signal outputted from the audio processing unit 17 as acoustic wave; a communication unit 20 for carrying out communication control of information with respect to other node devices via the network 8; and an input unit (e.g. a keyboard, a mouse, or an operation panel) 21 for receiving instruction from a user and providing the instruction signal corresponding to the instruction to the control unit 11, wherein the control unit 11, the memory unit 12, the buffer memory 13, the decoder 14, and the communication unit 20 are connected each other via a bus 22.

When CPU executes respective programs (including a node processing program) memorized in the memory unit 12 (recording medium of the present invention), the control unit 11 entirely controls the node. Further, the control unit 11 functions as an information collection message sending means, an information collection message receiving means, a return message receiving means, a response information generating means, and a return message returning means to thereby carry out processes described later.

Here, the above-mentioned node processing programs may be downloaded from for example a predetermined server on the network 8, or the programs may be recorded in a recording medium such as CD-ROM or the like and read in trough for example a drive of the recording medium.

[3. Operation of Information Communication System]

Next, an operation example in the above information communication system S is explained, wherein an information collection message sent from one node X participating in an overlay network 9 by multicast using the above-mentioned DHT (hereinafter referred to as "DHT multicast") is delivered to all other nodes, and the node X collects response information (by return message) to the information collection message.

(3.1. Multicast of Information Collection Message)

First, with reference to FIGS. 5 to 10, DHT multicast of the information collection message will be explained.

FIG. 5 is an example of routing table retained by the node X. FIG. 6 is a schematic view showing an information collection message. FIGS. 7 to 10 are views showing how the DHT multicast is carried out.

Here, the node X retains a routing table shown in FIG. 5. Columns corresponding to respective areas of levels 1 to 4 of the routing table memorize the node ID (4 digits, quaternary number), the IP address and so on of any one of node A to node I.

Further, the information collection message is configured by a packet including a header section and a payload section as shown in FIG. 6(A). The header section includes the node IP address (not shown) and the like of the node corresponding to an ID mask and a target node ID as a group specifying value indicating the target node ID and levels. The payload section includes a unique ID (unique ID with respect of every group of information collection message and return message) as identification information for identifying the message, main information including collection contents and the like. Here, in collection contents, for example, count of the number of nodes participating in the overlay network 9, count of the number of content viewers, count of the instantaneous viewing rate of the specific content, count of predetermined questionnaires are listed, and conditions of such counts, orders for respective nodes to carry out, and the like are also included in the collection content.

Here, a relation between the target node ID and the ID mask will be explained in detail.

The target node ID has the number of digits equal to that of the node ID (in FIG. 5, 4 digits, quaternary number), sets up the node of sending destination target, makes the node ID of node for example sending or transferring the information collection message in response to an ID mask value, and makes node ID of the node of sending destination.

Further, the ID mask designates the effective number of digits of the target node ID, and the node ID having the effective number of digits in common from the highest order in the target node ID is indicated. Specifically, the ID mask (ID mask value) is an integral number of the maximum digit number or less of the node ID of 0 or more. For example in a case of 4 digits quaternary number, the ID mask becomes an integral number of 0 to 4.

For example, as shown in FIG. 6(B), in the case of the target node ID of "2132" and the ID mask value of "4", all the target node ID of "four" digits are effective, and only a node with node ID of "2132" is a sending destination target of the information collection message.

Further, as shown in FIG. 6(C), in the case of the target node ID of "3301" and the ID mask value of "2", higher "two" digits of the target node ID are effective (node ID is "33**") and all the nodes on the routing table having higher two digits of "33" (lower two digits may be any value) become sending destination targets of the information collection message.

Further, as shown in FIG. 6(D), in the case of the target node ID of "1220" and the ID mask value of "0", higher "0" digit of the target node ID is effective, in other words, any digits may be any value (accordingly, the target node ID in this case may be any value), and all the nodes on the routing table become the sending destination target of the information collection message.

In a case where the node ID is a four digits quaternary number, the DHT multicast of the information collection message sent from the node X includes four steps to perform, i.e. stage one to stage four as shown in FIGS. 7 to 10.

(Stage 1)

First, the node X sets a node ID "3102" of the own (own node) for a target node ID in the header section and "0" for an ID mask and generates information collection message including the header section and the payload section. Then as shown in FIGS. 7(A) and 7(B), the node X refers to the routing table shown in FIG. 5 and sends the information collection message to respective nodes (nodes A, B, and C) registered in respective entries of table of level "1" where 1 is added to the ID mask "0".

(Stage 2)

Next, the node X generates information collection message where the ID mask "0" in the header section of the above information collection message is converted into "1". Here, since the target node ID is the own node ID, it is not changed. Then the node X refers to the routing table as shown in FIG. 5 and sends the information collection message to respective nodes (nodes D, E, and F) registered in the respective entries of the table of level "2" where 1 is added to the ID mask "1" as shown in the upper right area of the node ID space in FIG. 8(A) and FIG. 8(B).

On the other hand, in the stage 1, the node A receiving the information collection message (information collection message to the area to which the own belongs) from the node X converts the ID mask "0" in the header section of the information collection message into "1", and generates information collection message where the target node ID "3102" is converted into the own node ID "0132". Then the node A refers to the own routing table (not shown) and sends the information collection message to respective nodes (nodes A1, A2, and A3) registered in the respective entries of the table of level "2" where 1 is added to the ID mask "1" as shown in the upper left area of the node ID space of FIG. 8(A), and FIG. 8(B). In other words, in a case where the area "0XXX" to which the own belongs is further divided into plural areas ("00XX", "01XX", "02XX", and "03XX"), the node A determines one node (nodes A1, A2, and A3) which belongs to thus respective areas thus further divided and sends the received information collection message to all the nodes (nodes A1, A2, and A3) thus determined (hereinafter similar to the above).

Figure 8A:
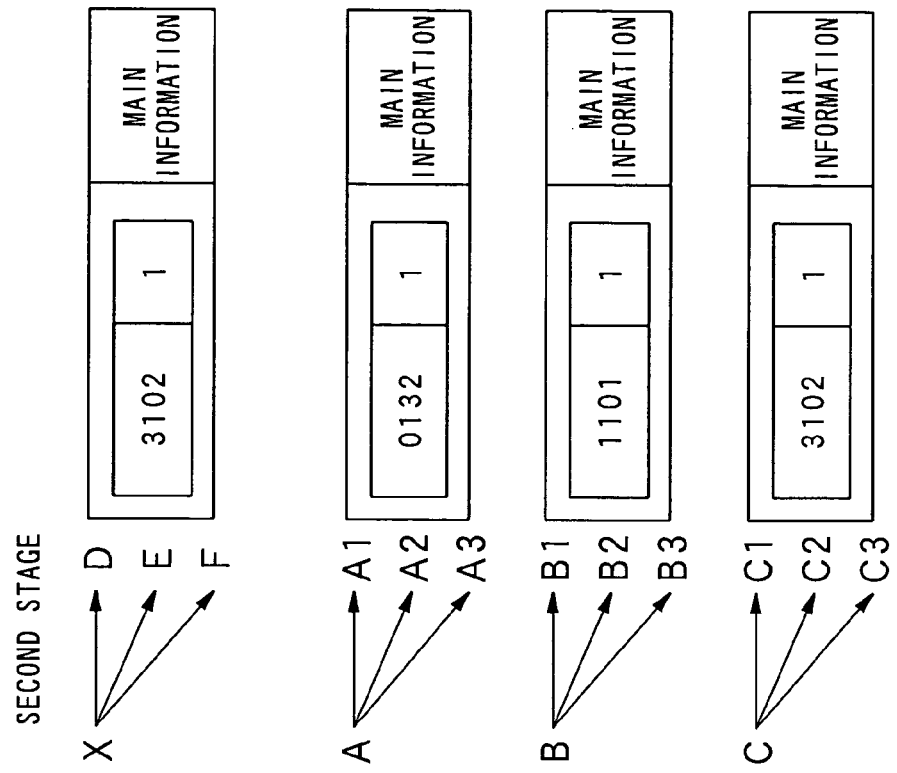
FIG. 8 is a view showing a state where DHT multicast is carried out.
Figure 8B:
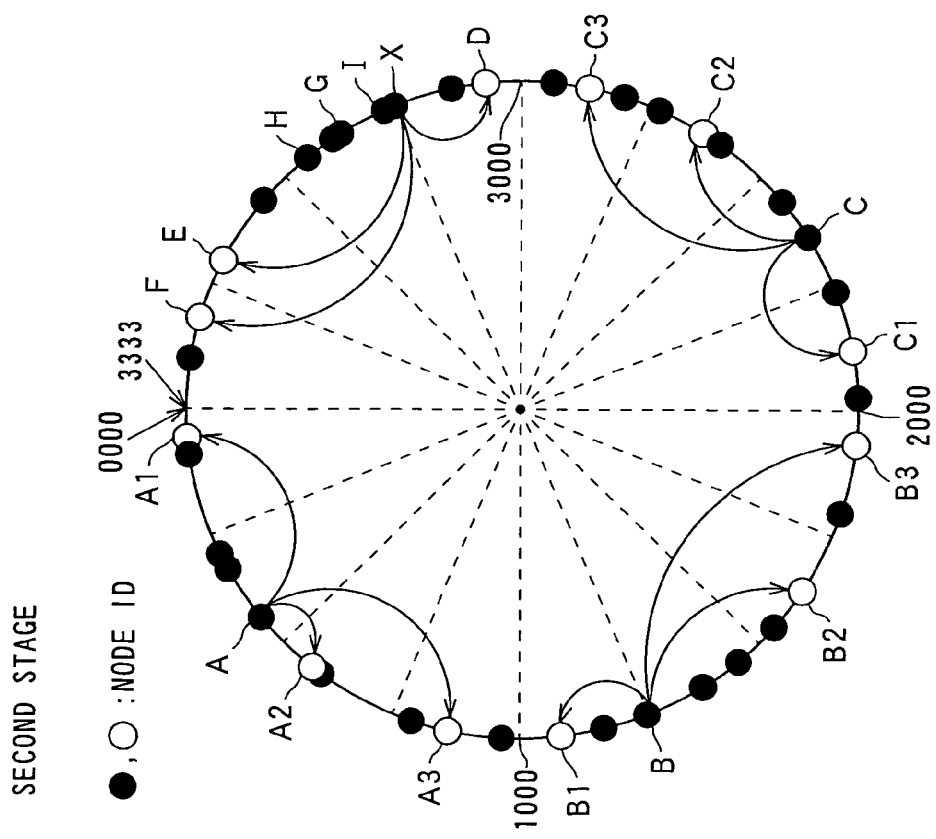

In a manner similar thereto, as shown in the lower left area and the lower right area of the node ID space of FIG. 8(A), and FIG. 8(B), in the stage 1, the node B and node C receiving the information collection message from the node X respectively refer to the own routing table, generate the information collection message, where the ID mask is set up to be "1" and the own node ID is set up to be the target node ID, to the respective nodes (nodes B1, B2, B3, C1, C2, and C3) registered in the respective entry of the table of level 2, and send these.
(Stage 3)

Next, the node X generates information collection message where the ID mask "1" in the header section of the above information collection message is converted into "2". Here, the target node ID does not change in a manner similar to the above. Then the node X refers to the routing table as shown in FIG. 5 and sends the information collection message to respective nodes (nodes G and H) registered in the respective entries of the table of level "3" where 1 is added to the ID mask "2" as shown in the upper right area of the node ID space in FIG. 9(A), and FIG. 9(B).

Figure 9B:
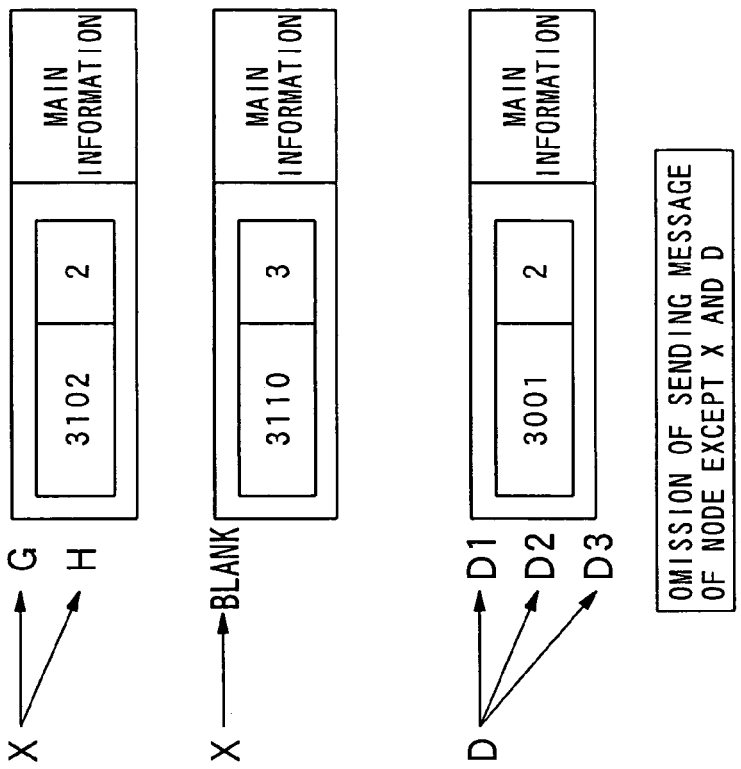
FIG. 9 is a view showing a state where DHT multicast is carried out.
Figure 9A:
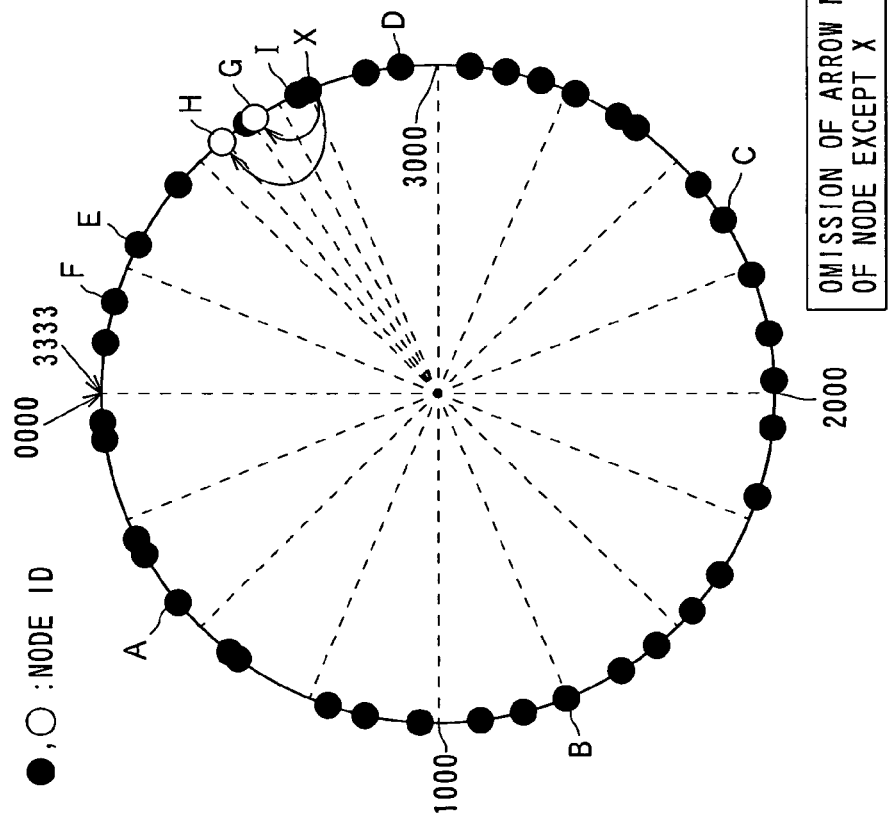

On the other hand, in the stage 2, the node D receiving the information collection message from the node X converts the ID mask "1" in the header section of the information collection message into "2", and generates information collection message where the target node ID "3102" is converted into the own node ID "3001". Then the node D refers to the own routing table and sends the information collection message to respective nodes (nodes D1, D2, and D3) registered in the respective entries of the table of level "3" where 1 is added to the ID mask "2" as shown in FIG. 9(B).

In a manner similar thereto, although not shown, in the stage 2, the nodes E, F, A1, A2, A3, B1, B2, B3, C1, C2, and C3 receiving the information collection message respectively refer to the own routing table, generate the information collection message, where the ID mask is set up to be "2" and the own node ID is set up to be the target node ID, to the respective nodes (not shown) registered in the respective entries of the table of level 3, and send these.

(Stage 4)

Next, the node X generates information collection message where the ID mask "2" in the header section of the above information collection message is converted into "3". Here, the target node ID does not change in a manner similar to the above. Then the node X refers to the routing table as shown in FIG. 5 and sends the information collection message to node I registered in the respective entries of the table of level "4" where 1 is added to the ID mask "3" as shown in the upper right area of the node ID space in FIG. 10(A) and FIG. 10(B).

On the other hand, in the stage 3, the node G receiving the information collection message from the node X converts the ID mask "2" in the header section of the information collection message into "3" and generates information collection message where the target node ID "3102" is converted into the own node ID "3123". Then the node G refers to the own routing table and sends the information collection message to the node G1 registered in the respective entries of the table of level "4" where 1 is added to the ID mask "3" as shown in FIG. 10(B).

In a manner similar thereto, although not shown, in the stage 3, the respective nodes receiving the information collection message also refer to the own routing table, generate the information collection message, where the ID mask is set up to be "3" and the own node ID is set up to be the target node ID, to the respective nodes registered in the respective entries of the table of level 4, and send these.
(Final Stage)

Finally, the node X generates information collection message where the ID mask "3" in the header section of the above information collection message is converted into "4". Then the node X recognizes that the information collection message is addressed to the own (own node) based on the target node ID, and the ID mask and sending process is finished.

On the other hand, in the stage 4, respective nodes 1 receiving information collection message also generates information collection message where ID mask "3" in the header section of the information collection message is converted into "4". Then the node 1 recognizes that the information collection message is addressed to the own (own node) based on the target node ID and the ID mask and sending process is finished.

Here, the unique ID included in the payload section of the information collection message is ID unique to each information collection message, and for example the ID does not change until one message sent from the node X is transferred and reaches the last node. Further, a unique ID same as a source of the information collection message is also provided to a return message returned from the respective nodes in response to the information collection message.
(3.2 Collection of Response Information to Information Collection Message)

Figure 11:
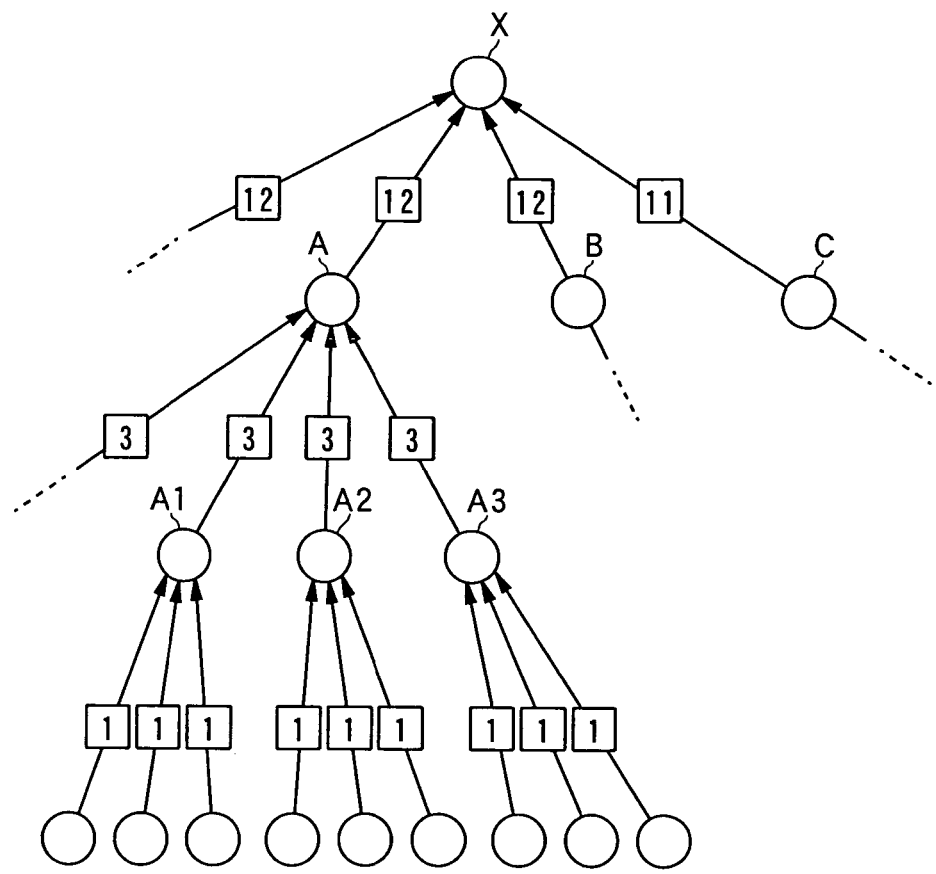
FIG. 11 is a view showing a state where a return message is sequentially returned from a downstream node to an upstream node.

Next, with reference to FIG. 11, collection of the return message is explained.

FIG. 11 is a view showing a state where the return message is sequentially returned from the downstream node to the upstream node.

All the nodes receiving the above information collection message generate response information to the information collection message and return the return message including the response information to the upstream node, in other words, the node sending the information collection message (node to the target node ID of the information collection message). Here in a case where the downstream node, in other words, the node receiving the return message returned from the other side node where the own sends the information collection message is received, new response information is generated based on the response information included in the received return message and the own response information (e.g. a value (e.g. counting result) indicated by the response information included in the received return message and a value (e.g. counting result) indicated by the own response information being counted to generate response information), and the return message including the new response information thus generated is returned to the upstream node.

In an example of FIG. 11, in respective nodes on a return path from a downstream node to an upstream node, any information (e.g. number of nodes participating in an overlay network 9) is counted (in this case, 1 is added to an aggregate calculation result R from the down stream for the node participating in the overlay network 9). The aggregate calculation result R becomes response information.

Further, respective nodes include the unique ID included in the received information collection message in the return message responding thereto and return the return message. Accordingly, it is possible to discriminate from other collection results (aggregate calculation results).

Thus the node X being a sending source of information collection message collects response information to the information collection message, from all the nodes participating in the overlay network 9.

(3.3. Process in Respective Nodes)

Next, in an operation of the above-mentioned information communication system S, processes carried out with the control unit 11 of the respective nodes will be described in detail with reference to FIGS. 12 to 16.

Figure 12:
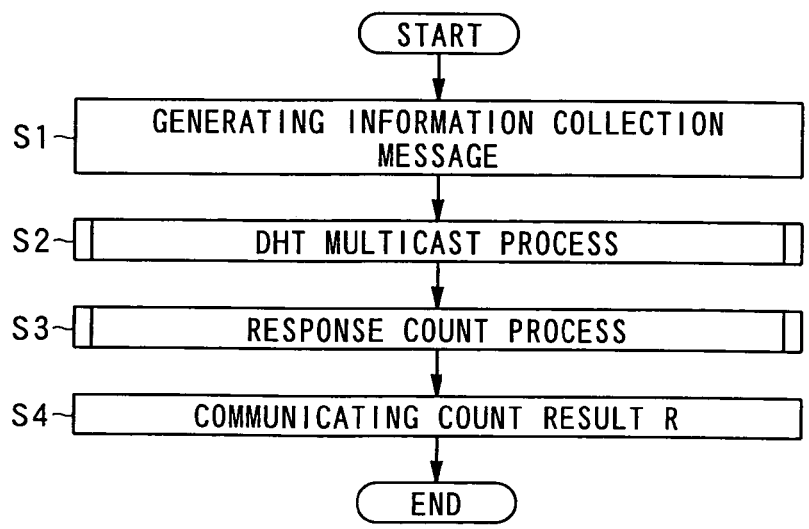
FIG. 12 is a flowchart showing a process in a node of sending source of an information collection message.
Figure 13:
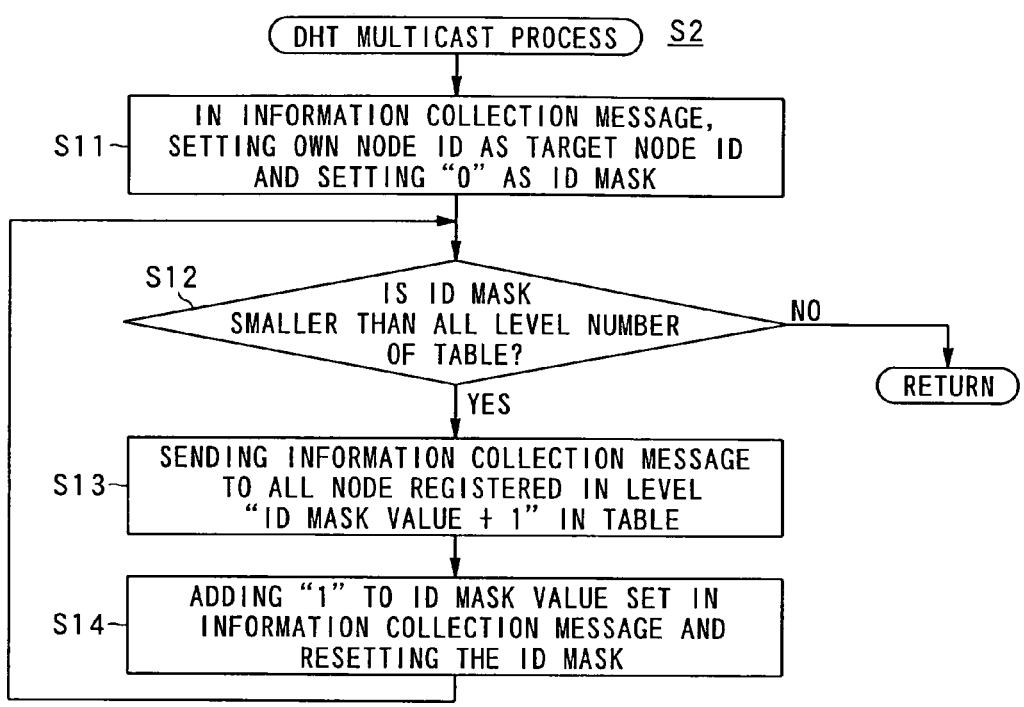
FIG. 13 is a flowchart showing detail of a DHT multicast process.
Figure 14:
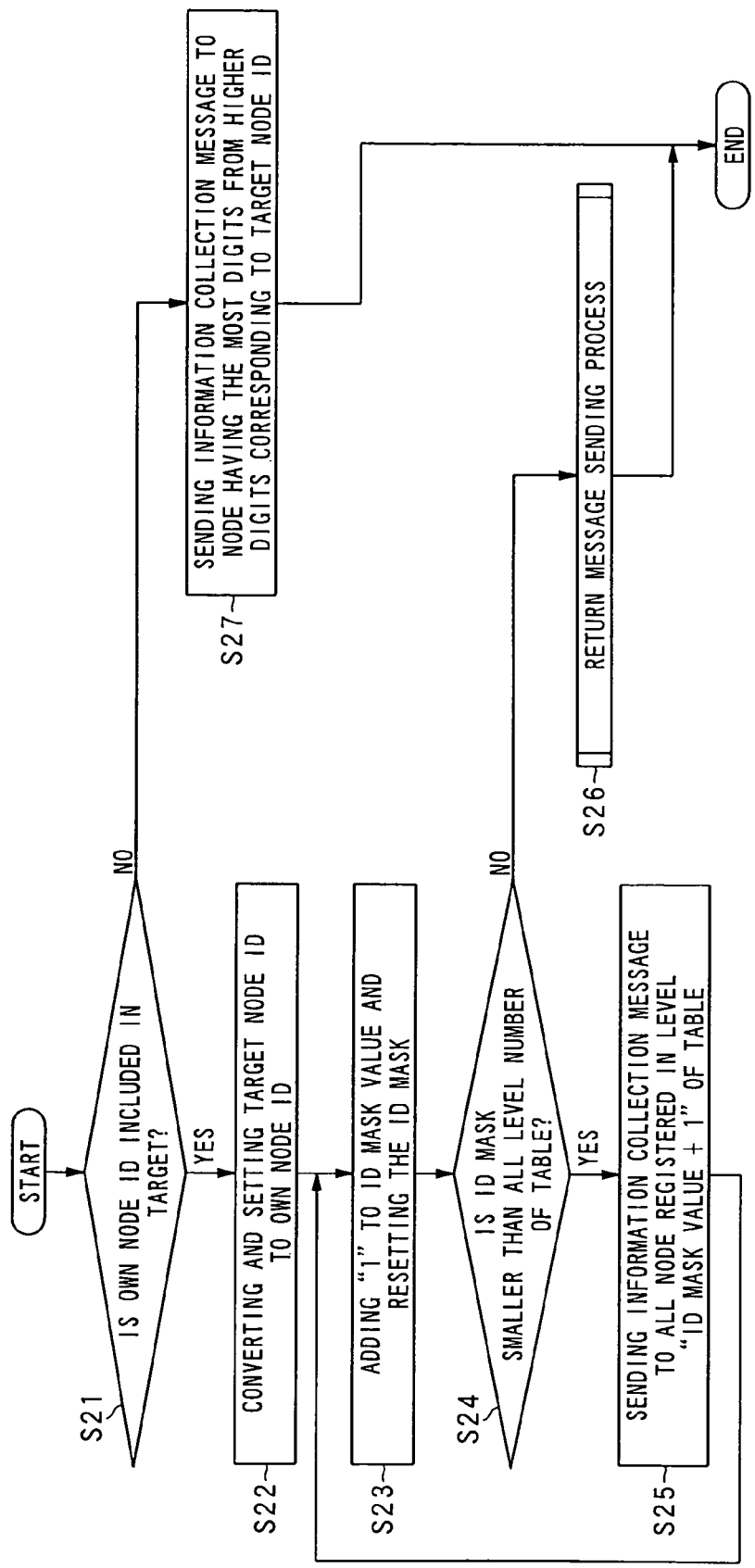
FIG. 14 is a flowchart showing a process in a node receiving information collection message.
Figure 15:
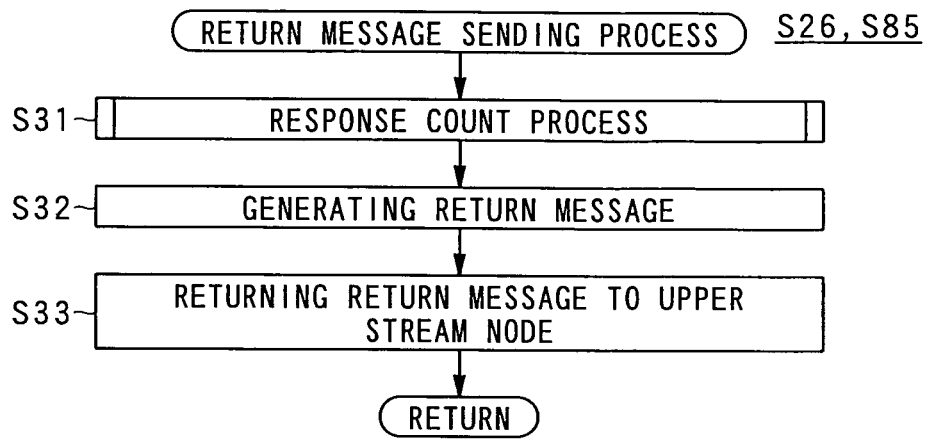
FIG. 15 is a flowchart showing detail of a process of sending a return message.
Figure 16:
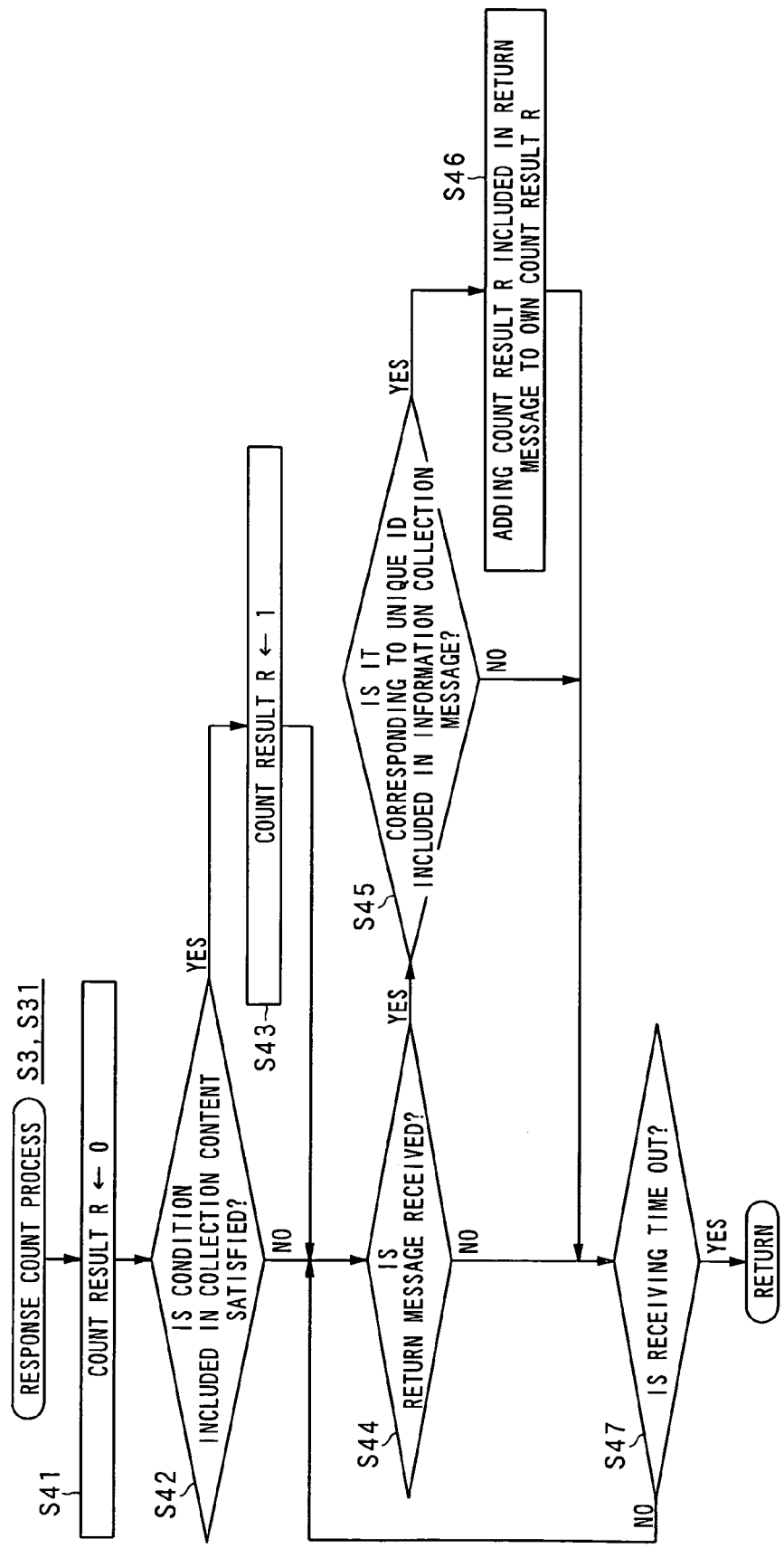
FIG. 16 is a flowchart showing detail of a response counting process.

FIG. 12 is a flowchart showing a process in a node of sending source of an information collection message. FIG. 13 is a flowchart showing a DHT multicast process in detail in FIG. 12. FIG. 14 is a flowchart showing a process in a node receiving the information collection message. FIG. 15 is a flowchart showing a process of sending a return message in detail in FIG. 14. FIG. 16 is a flowchart showing a response counting process in detail in FIG. 12 or FIG. 15.

The respective nodes participating in the overlay network 9 are activated (i.e. powered in and initializing various settings) and in a standby state for an instruction from users through an input unit 21 and for receiving a message from the other nodes through the network 8.

For example, in an arbitrary node X, a process shown in FIG. 12 starts by user inputting an information collection message sending instruction through the input unit 21. First, the control unit 11 of a node X acquires a unique ID and collection content and generates an information collection message including thus acquired unique ID and collection content in the payload section (Step S1).

Here, since it is necessary to use a number which is not used in past within the entire overlay network 9 should be used as the unique ID. Therefore, for example, a hash value obtained by hashing a value, which is obtained by adding a predetermined value to its own manufacturing number, using an above-mentioned common hash function is used as a unique ID. Or a management server managing a unique ID of a message is prepared, and the respective nodes are connected to the management server to acquire the unique ID, which does not overlap (in this case, the unique ID may be the serial number increasing by a predetermined value (e.g. 1) which is not a hash value).

Further, collection content is previously selected or set up by the user so as to be memorized in the memory unit 12.

Next, the control unit 11 of the node X starts the DHT multicast process (Step S2).

In the DHT multicast process, as shown in FIG. 13, the control unit 11 of the node X sets up the own node ID "3102" as a target node ID in the header section of information collection message thus generated, sets up "0" as an ID mask, and set up the own IP address as an IP address (Step S11).

Next, the control unit 11 judges whether or not the ID mask value thus set up is smaller than all level number ("4" in an example of FIG. 5) of the self routing table (Step S12).

Since "0" is set up in the ID mask now, and the ID mask value is smaller than the all level number of the routing table, the control unit 11 judges that the ID mask is smaller than the all level number of the routing table (Step S12: YES), determines all the nodes which are registered in the level of "ID mask thus set up+1" in the own routing table (i.e. determining one node which belongs to the further divided respective areas because an area to which the node X belongs is further divided into plural areas), and sends the above-mentioned information collection message thus generated to the node thus determined (Step S13).

For example, in an example of FIG. 5, the information collection message is sent to the node A, node B, and node C which are registered in the level 1 being "ID mask "0"+1".

Next, the control unit 11 adds "1" to the ID mask value set up in the header section of the information collection message and resets the ID mask (Step S14). Then the process returns to Step S12.

Then the control unit 11 similarly repeats the process of Steps S12 to S14 with respect to ID mask "1", "2", and "3". Accordingly, the above-mentioned information message is sent to all the nodes registered in the own routing table.

On the other hand, in Step S12, in a case where it is judged that the ID mask value is not smaller than the all level number of the own routing table (the ID mask value being "4" in an example of FIG. 5). The process returns to the steps shown in FIG. 12).

Next, the respective nodes receiving the information collection message thus sent memorize the information collection message and start the process shown in FIG. 14. Here the node A is exemplified for explanation.

When the process shown in FIG. 14 is started, the control unit 11 of the node A judges whether or not the own node ID is included in the target specified by the target node ID and the ID mask in the header section of the received information collection message (Step S21).

Here, the target indicates the node ID having common upper digits which are the value of the ID mask in the target node ID. For example in a case of ID mask "0", all the node IDs are included in the target, in a case of ID mask "2" and target node ID "3102", the node ID of "31" ( may be any value.) where upper "2" digits are "31" is included in the target.

Since the ID mask in the header section of the information collection message received by the node A is "0" and an effective digits number is not designated, the control unit 11 of the node A judges that the own node ID "0132" is included in the target (Step S21: YES), and converts to set up the target node ID in the header section of the information collection message into the own node ID "0132" (Step S22).

Next, the control unit 11 resets the ID mask by adding "1" to the ID mask value in the header section of the information collection message (here, converting from "0" to "1" (changing the ID mask indicative of the level one to the ID mask indicative of the next level)) (Step S23).

Next, the control unit 11 judges whether or not the ID mask value thus reset is smaller than the all level number of the own routing table (Step S24).

Now, since the ID mask is set up to be "1", being smaller than the all level number of the routing table, the control unit 11 judges that the ID mask is smaller than the all level number of the routing table (Step S24: YES), determines all the nodes registered in the level "thus reset ID mask+1" (i.e. determining one node belonging to respective areas which are further divided because the area to which the node A belongs is divided into plural areas), and sends the information collection message thus generated to thus determined node (Step S25). Then the process returns to the Step S23.

For example, the information collection message is sent to node A1, node A2, and node A3 registered in the level 2 having "ID mask "1"+1".

Subsequently, the control unit 11 similarly repeats the process of Steps S24 and S25 with respect to ID masks "2" and "3". Thus the information collection message is sent to all the nodes registered in the own routing table.

On the other hand, in the Step S21, in a case where the control unit 11 judges that the own node ID is not included in the target specified by the target node ID and the ID mask in the header section of the received information collection message (Step S21: NO), the control unit 11 sends (transfers) the received information collection message to the node having the upper digits matching more with the target node ID in the routing table (Step S27). Then the process is finished.

For example, if the ID mask is "2" and the target node ID is "3102", it is judged that the node ID "0132" of the node A is not included in the target "31**". Here, the transfer process of Step S27 is a process of transferring message using the ordinary DHT routing table.

On the contrary, in a case where the control unit 11 judges that the ID mask value is not smaller than the number of all levels of the own routing table in the above Step S24 (Step S24: NO), the control unit 11 starts a return message sending process (Step S26).

In the return message sending process, as shown in FIG. 15, the control unit 11 of the node A carries out a response count process for generating response information (Step S31).

In the response count process, as shown in FIG. 16, the control unit 11 of the node A initializes the aggregate calculation result F (variable number) to "0" (Step S41) and judges whether or not conditions included in collection content in the payload section of the received information collection message are satisfied or not (Step S42).

Here, in a case where the collection content is an aggregate calculation of number of nodes participating in the overlay network 9, the condition is "receiving the information collection message", that is, all the nodes receiving the information collection message satisfy the condition.

Here, in a case where the collection content is an aggregate calculation of the number of viewers of the contents, the condition is "reproducing the content data" and the node which is reproducing any contents satisfies the conditions.

Further, in a case where the collection content is an aggregate calculation of the instantaneous viewer rate of the specific content, the condition is "reproducing the specific content data (e.g. indicated by content name and content ID)", the node reproducing the specific content satisfies the condition.

Further, in a case where the collection content is an aggregate calculation of predetermined questionnaire (the questionnaire being displayed in the display unit 16) where "YES" or "NO" is answered, the condition is "selection by the user through the input unit 21 is "YES" (or "NO")" and the node selecting for example "YES" by user operating the input unit 21 satisfies the condition.

Then, in a case where the control unit 11 judges that the condition included in such the collection content is satisfied (Step S42: YES), the aggregate calculation result R is set up to be "1" (Step S43). On the other hand, in a case where the condition included in such the collection content is not satisfied (Step S42: NO), the aggregate calculation result R remains to be "0".

Next, the control unit 11 judges whether or not the return message included in the aggregate calculation result R (the return message from the downstream node being a destination where the own sends the information collection message) is received from the other node (Step S44). In a case where it is received (Step S44: Y), the control unit 11 judges whether or not the unique ID included in the received return message matches the unique ID included in the received information collection message being a subject of the ongoing process (Step S45).

Then, in a case where the control unit 11 judges that the unique IDs match (Step S45: YES), the aggregate calculation result R included in the received return message is added to the own aggregate calculation result R "1" in the above Step S43 (Step S46).

Then, the control unit 11 judges whether or not receive timeout is over (that is, whether or not the set receive timeout value is exceeded) (Step S47). In a case where the receive timeout is not over (Step S47: NO), the process returns to Step 44, and the processes of Steps S44 to S46 is repeated by the receive timeout.

Then, in a case where the receive timeout is over (Step S47: YES), the aggregate calculation result R finally obtained is the response information. The process returns to the steps shown in FIG. 15. In other words, new response information is generated based on the response information included in the return message returned within the receive timeout as a predetermined time and the own response information. Accordingly, because the response information included in the return message returned after the predetermine time can be ignored, a quick response can be returned to the upstream node.

Here, the receive timeout value is desired to be set up longer in the upper stream (gradually longer the node goes further upward) in the transfer path. For example, in a case where the receive timeout value of node in the lowest downstream is T1, the receive timeout value of the node located in one-step upper stream is T2, and the receive timeout value of the node located in two-step upper stream is T3, it is desired to be set up such that T1<T2 (e.g. 2×T1)<T3 (e.g. 3×T1). It is judged from for example ID mask of the information collection message at which point of the transfer path the own node is located. In a case where the value of the ID mask is large (e.g. "3"), the receive timeout value is set up small (e.g. 1×T1) because the own node is located downstream. In a case where the value of the ID mask is small (e.g. "0"), the receive timeout value is set up large (e.g. 3×T1) because the own node is located upstream (the setting is carried out in the above Step S41). According to such the configuration, a standby time of the return message from the downstream node can be fully secured in the upstream node, and a wasteful standby time can be cut down in the downstream node.

Thus, when the response count process is finished, and the process returns to the steps shown in FIG. 15, the control unit 11 generates the return message including the unique ID included in the above-mentioned information collection message and the aggregate calculation result R as the generated response information (Step S32).

Next, the control unit 11 sends (returns) thus generated return message to the upstream node (the node sending the information collection message) in reference of the IP address or the like included in the information collection message (Step S33). Then the process is finished. The return message thus returned is received and judged in the above-mentioned Step S44, carried out in the upstream node.

On the other hand, in the node X being a source sending information collection message, the response count process shown in FIG. 16 is carried out (Step S3) after the DHT multicast process is completed as shown in FIG. 12, and the aggregate calculation result R finally obtained in the response count process is that reflecting the calculation result R included in the respective return messages.

Then, the control unit 11 of the node X memorizes and stores the aggregate calculation result R finally obtained, as a log in the memory unit 12 and notifies to the user of the node X, for example by displaying in the display unit 16 or audio outputting from the speaker 18 (Step S4), and the process is finished. Thus the user (a manager and the like) of the node X can view the aggregate calculation result R. Further, the aggregate calculation result R can be used for viewer rate and variety of analysis.

According to the above-mentioned embodiments, as described above, since one node participating in the overlay network 9 sends the information collection message to all other nodes by the DHT multicast process, basically it is possible to send the information collection message more effectively to all other nodes participating in the overlay network 9 without using the management server or the like. Further, since the respective nodes receiving the information collection message return the return message including the response information to the upstream node (sending the return message in a direction opposite to the DHT multicast), the node of sending source of the information collection message can reduce burden applied to the network 8 and collect responses from all other nodes efficiently.

Here, for example special terminals for management which do not participate in the overlay network 9 cannot be subjected to the DHT multicast process. In such the case, the above process may be carried out by any nodes participating in the overlay network 9, and the aggregate calculation result R may be sent (notified).

Further, although in the above embodiments the response information is the aggregate calculation result R of the alternative (satisfying the condition or not) in the respective nodes, the response information may be the aggregate calculation result of choice of threefold choice or more. In this occasion, for example in a case where the first one of the questionnaire is selected, "1" is added to the aggregate calculation result R1, in a case where the second one of the questionnaire is selected, "1" is added to the aggregate calculation result R2, and in a case where the third one of the questionnaire is selected, "1" is added to the aggregate calculation result R3. Then response information including the aggregate calculation results R1, R2, and R3 is returned. According such the configuration, the node collecting information can obtain a detailed response.

Further, although the aggregate calculation result is the response information in the above embodiment, it may be configured such that the respective nodes include any information in the response information without particularly conducting the aggregate calculation.

Modified Example

Next, although in the above embodiment respective nodes send the information collection message to only the node having the IP address memorized in the own routing table, there will be described, with reference to FIGS. 17 to 19, a modified example that the information collection message is sent to the node having the IP address not registered in the routing table.

When the node participates in and withdraws from the overlay network 9, it is not reflected yet in the routing table in some node. In this case, it is possible to occur that the information collection message does not reach to all the nodes with the above-mentioned DHT multicast. In this modified example, even in a case where it occurs, the information collection message can be sent to all the nodes participating in the overlay network 9.

Here, in this modified example, duplicated explanation is omitted with respect to the similar portion to the above-mentioned embodiment.

The above-mentioned processes shown in FIGS. 12, 15 and 16 are also applied to this modified example and carried out in a manner similar to the above-mentioned embodiment.

Figure 17:
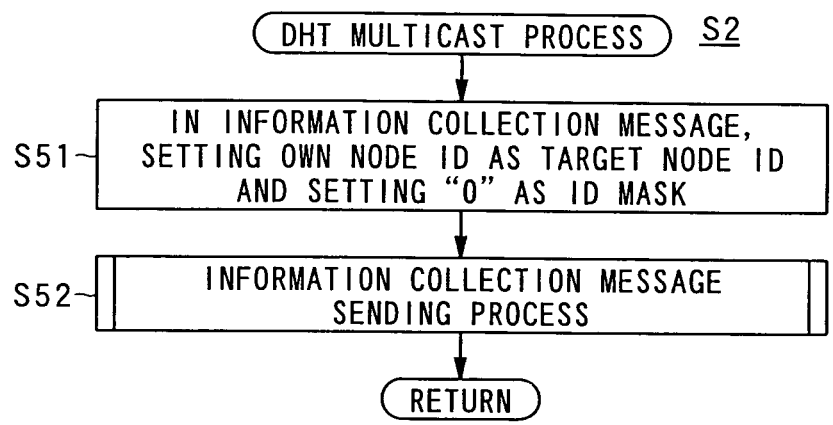
FIG. 17 is a flowchart showing detail of a DHT multicast process in a modified example.
Figure 18:
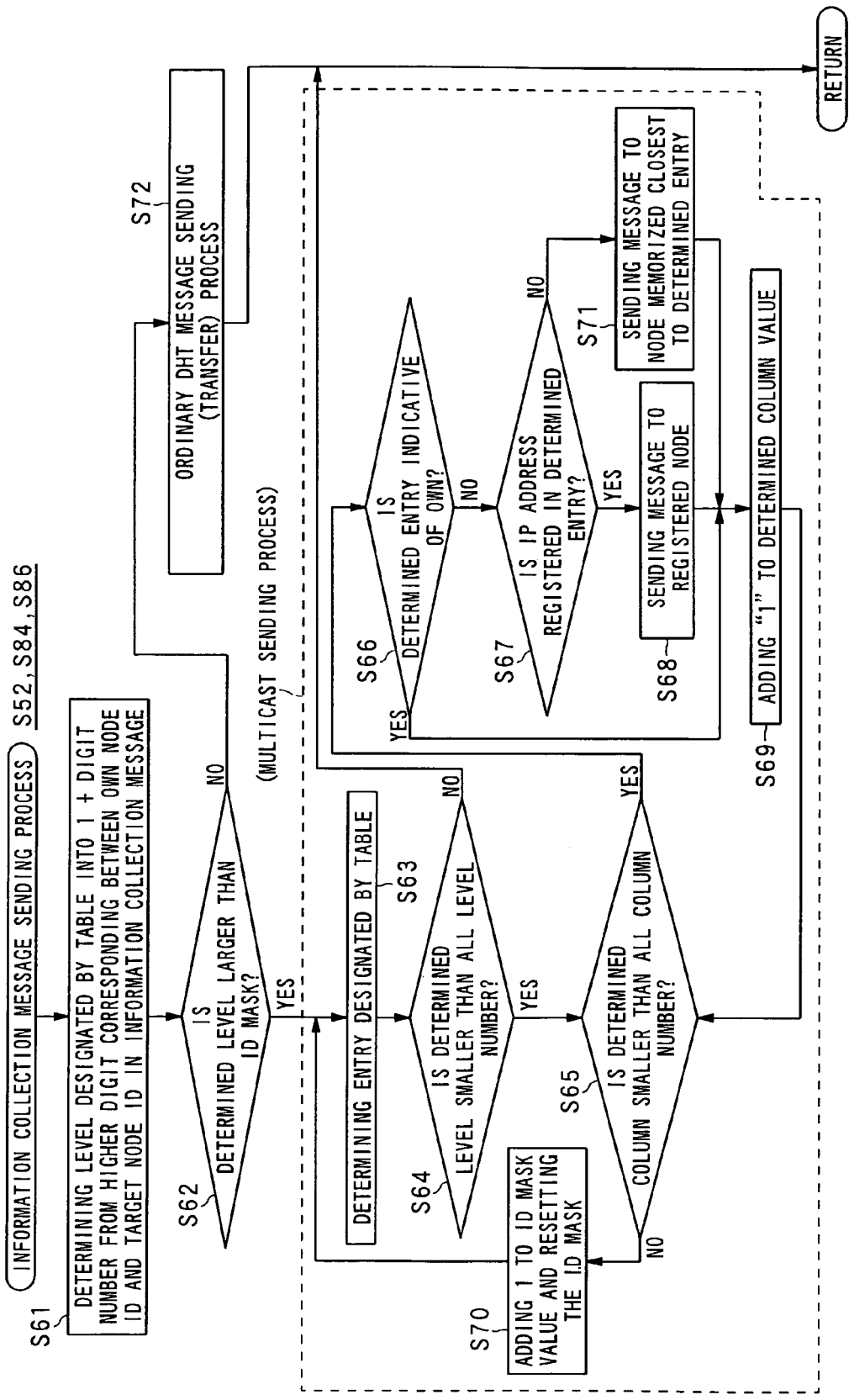
FIG. 18 is a flowchart showing detail of a DHT multicast process in a modified example.

On the other hand, the above-mentioned process shown in FIG. 13 is not applied to this modified example, and the above-mentioned processes shown in FIGS. 17 and 18 are instead carried out. Further, the above-mentioned process shown in FIG. 14 is not applied to this modified example, and the process shown in FIG. 19 is instead carried out.

Further, the header section of the information collection message sent in the modified example includes a transfer frequency integrated value (value increasing by 1 count every time the node is transferred) and a transfer frequency higher limit value. This is to prevent the possibility that the message is continued to transfer, in a case where the information collection message is sent to the node having the IP address which is not registered in the routing table.

In the DHT multicast process shown in FIG. 17, in a manner similar to Step S11 in the above embodiment, the control unit 11 of the node X sets the own node ID "3102" as a target node ID in the header section of information collection message thus generated in Step S1 shown in FIG. 12, sets "0" as an ID mask, and sets up the own IP address as an IP address (Step S51).

Next, the control unit 11 starts the information collection message sending process (Step S52).

As shown in FIG. 18, in the information collection message sending process, the control unit 11 of the node X determines the level designated by the own routing table at 1+a value of the digit number, from the higher digits, where the own node ID corresponds with the target node ID in the information collection message (Step S61).

For example, in a case where the own node ID is "3102" and the target ID is "3102", all digits are correspondent and the correspondent digit number is "4". Therefore, 1 is added to this and the level of the routing table is determined at level "5".

Next the control unit 11 judges whether or not thus determined level is larger than the ID mask in the generated information collection message (Step S62).

In the above-mentioned example, since the determined level "5" is larger than the ID mask "0" in the information collection message, the control unit 11 judges that the determined level is larger than the ID mask (Step S62: YES), and the process goes to Step S63.

In Step S63, the control unit 11 determines the entry designated by the own routing table (i.e. level and column). More particularly, the control unit 11 respectively determines the designated level at "1+the ID mask value in the information collection message" and determines the designated column in a line from left of the level.

Here, in a case where the routing table consists of A digits and B base number, the level value is 1 to A and the column value is 1 to B. In a case of 4 digits and 4 base number as described above, the level is 1 to 4 (all level number is 4) and the column is 1 to 4 (all column number is 4). In the above example, since the ID mask in the information collection message is "0", "level 1, column 1" in the routing table is designated.

Next the control unit 11 judges whether or not the level value thus determined is smaller than all level number (Step S64). In the above example, since the determined level value "1" is less than the all level number "4", the control unit 11 judges that the determined level value is less than the all level number (Step S64: YES), and judges whether or not the determined column value is less than the all column number (Step S65). In the above example, since the determined column value "1" is less than the all column number "4", the control unit 11 judges that the determined level value is less than the all level number (Step S65: YES). Subsequently the control unit 11 judges whether or not the determine column indicates the own (own node ID) (Step S66). In the above example, since the own node ID is not registered in the determined entry "level 1, column 1", the control unit 11 judges that the determined entry does not indicate the own (Step S66: NO) and the process goes to Step S67.

In Step S67, the control unit 11 judges whether or not the IP address or the like is registered in the determined entry. In the above example, since the IP address of the node A is registered in the determined "level 1, column 1", the control unit 11 judges that the IP address or the like of the node is registered in the determined entry (Step S67: YES) and sends the information collection message to the registered node (according to the IP address) (Step S68).

Next, the control unit 11 adds "1" to the value of the determined column (Step S69). Then the process returns to Step S65.

Then, processes of Steps S65 to S69 are repeated, and for example in FIG. 5, the information collection message is also sent to the node B registered in the entry of "level 1, column 2" and the node C registered in the entry of "level 1, column 3". The determined entry is changed to "level 1, column 4". Then the process returns to Step S65.

Next, since in the process of Step S66 through the Step S65, thus determined entry of "level 1, column 4" indicates the own, the control unit 11 judges that the determined entry indicates the own (Step S66: YES), and the process goes to Step S69. Therefore, the information collection message can be sent to all the nodes 1 registered in the level 1 of the routing table.

On the other hand, in a case where the control unit 11 judges that the determined column value is not less than all column number (Step S65: NO) in the process of the above Step S65, the control unit 11 adds 1 to the value of the ID mask set up in the header section of the information collection message and resets the ID mask (Step S70). Then the process returns to Step S63 and repeats the similar processes.

Meanwhile, in a case where the IP address or the like of the node is not registered in thus determined entry (Step S67: NO) in the process of Step S67, the control unit 11 sends the information collection message to the node memorized closest to thus determined entry (e.g. "level 3, column 2") (Step S71). In the above example, the ID mask value is "3", and the target node ID is "3110" which falls into the entry of "level 3, column 2".

Therefore, in a case where the node corresponding to this entry participates, the information collection message can be sent by specifying the target. Here, in the above example, the information collection message may be sent to the node G to be transferred.

Here, the transfer frequency upper limit value in the header section of the information collection message is a value to determine the upper limit of transfer frequency and is set up to prevent the message from continuous transfer in a case where the target node does not exist. The transfer frequency upper limit value is set up to be a rather larger value which does not absolutely exceed in the ordinary transfer. For example, in a case of using the routing table having the level number of 4, the transfer frequency is ordinarily within four times and in this case, the transfer frequency upper limit value is for example 8 times, 16 times, etc.

On the other hand, in the process of the above Step S64, it is judged that thus determined level value is not less than all level number (Step S64: NO). Then the process is finished.

Meanwhile, for example in a case where the own node ID is "3102" in the process of the above Step S61, the target node ID is "2132", and the ID mask is "4", the corresponding digit number is "0", 1 is added thereto, and the designated level of the routing table is determined as "1". In this case, in Step S62, since the determined level is smaller than the ID mask "4" in the information collection message, the process goes to Step S72, and the ordinary DHT message sending (transfer) process is carried out. More particularly, the control unit 11 determines the node which is the closest to the target node ID in the determined level and registered in the routing table, sends (transfers) the information collection message to the node and finishes the process.

Figure 19:
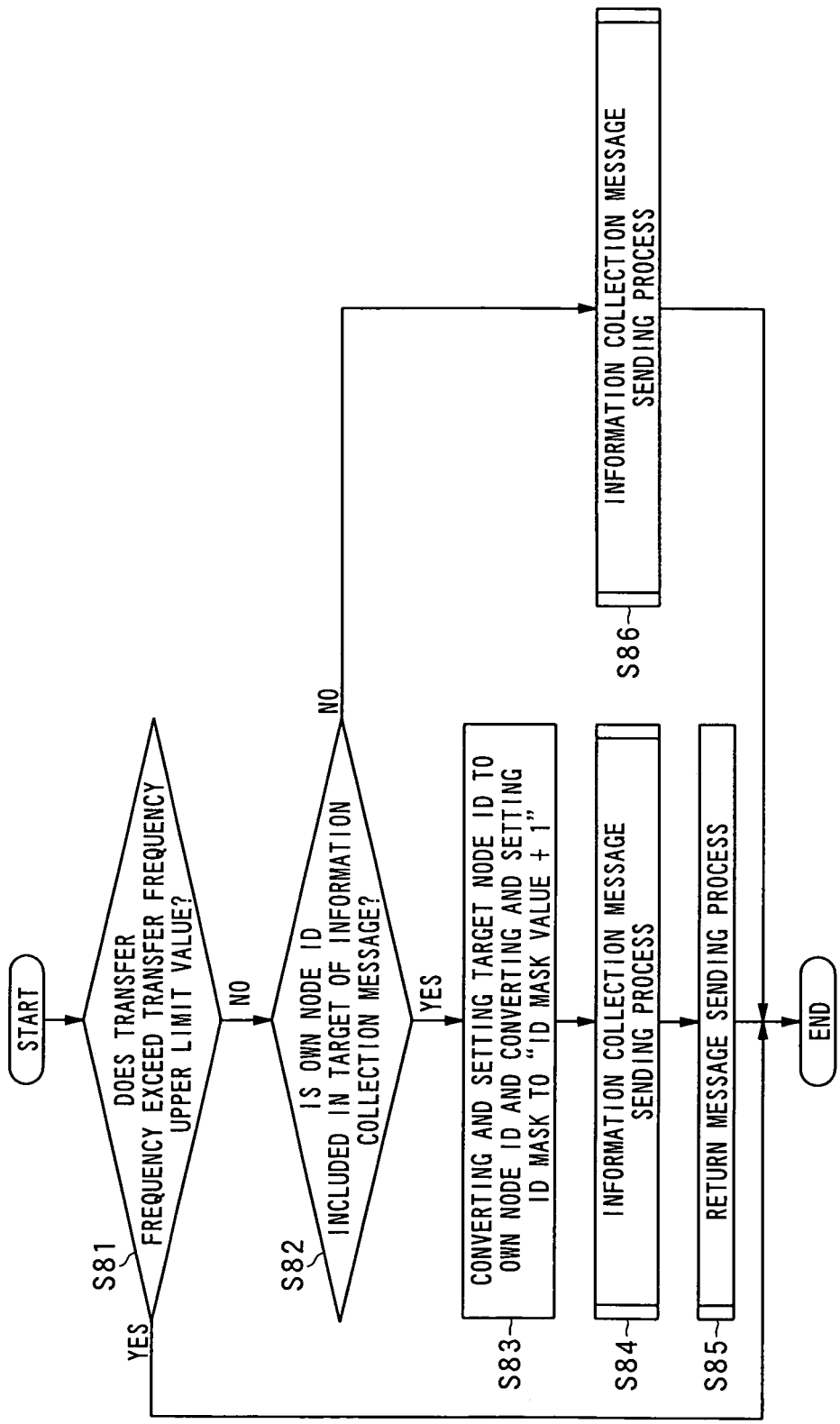
FIG. 19 is a flowchart showing a process in a node receiving an information collection message in a modified example.

Next, the respective nodes receiving thus sent information collection message memorize the information collection message and start the process shown in FIG. 19.

When the process shown in FIG. 19 is initiated, the control unit 11 of the node judges whether or not the transfer frequency of the information collection message exceeds the transfer frequency upper limit value (Step S81). In a case where the transfer frequency upper limit value does not exceed (Step S81: NO), the own node ID judges whether or not it is included in the target of the received information collection message (Step S82). Here, in a case where the ID mask in the information collection message is "0", since all the nodes ID are included as described above, the control unit 11 judges that the own node ID is included in the above target (Step S82: YES), sets up to convert the target node ID in the header section of the received information collection message into the own node ID, sets up to convert the ID mask into "1+the ID mask value of the information collection message" (Step S83), and carries out the information collection message sending process shown in FIG. 18 with respect to the information collection message (Step S84). Then upon the completion of the information collection message sending process, the control unit 11 carries out the return message sending process shown in FIG. 15 in a manner similar to the embodiment (Step S85) and finishes the process.

On the other hand, in the process of the above Step S82, in a case where it is judged that the own node ID is not included in the target (Step S82: NO), the control unit 11 carries out the information collection message sending process shown in FIG. 18 with respect to the received information collection message (Step S86) and finishes the process.

On the other hand, in the process of Step S81, it is judged that the transfer frequency of the received information collection message exceeds the transfer frequency upper limit value (Step S81: YES), transfer is not carried out. Then, the process is finished.

As described above, according to the above modified example, when the nodes carries out participation in/withdrawal from the overlay network 9, even in a case where it is not yet reflected in the routing table of the node thereof, the information collection message can be sent to all the nodes participating in the overlay network 9.

Further, in the above embodiment, the explanation was given on a premise that the overlay network 9 is configured by algorithm using DHT. However, the present invention is not limited thereto.

The present invention is not confined to the foregoing embodiments. The embodiments are exemplification, and any one having a configuration and an effect substantially similar to the technical concept described in the claims of the present invention is incorporated in the technical scope of the present invention.

What is claimed is:

1. A node device in an information communication system including a plurality of node devices which mutually communicate through a network,
the node device comprising: a memory unit that memorizes a routing table which registers network address of at least one representative node device of the plurality of node devices connected to an overlay network configured by the plurality of the node devices; and a control unit that is configured to:
determine at least one representative node device registered in the routing table,
send an information collection message to the determined representative node device,
receive the information collection message which is sent from another node device in the overlay network; generate new response information based on the received collection message; and
send a return message including the new response information thus generated to the other node device, receive the return message including the response information,
wherein the control unit generates the new response information from the response information of another node device in which the information collection message is received by control unit and the response information included in the return message returned from another node device thus determined within a predetermined time, wherein the return message is one received by the control unit, and the information collection message includes a header section and a payload section, the header section including an IP address of another node device as a sending destination, payload section including identification information for identifying the message and main information including collection content.

2. The node device according to claim 1,
wherein the control unit aggregates a value indicated by the response information included in the return message received by the control unit and a value indicated by the response information of the node device in which the information collection message is received by the control unit, and generates new response information.

3. The node device according to claim 1,
wherein the information collection message includes identification information for identifying the message, and
the control unit attaches identification information, which is included in the information collecting message, to the return message that responds to the information correction message and returns the return message.

4. The node device in an information communication system according to claim 1,
wherein, the memory unit that memorizes network address of at least one representative node device belonging to each one of first groups in correspondence with the first groups as first level information, and network address of at least one or more representative node devices belonging to second groups in correspondence with the second groups as the second level information;
wherein any node devices in the plurality of node devices are divided into a plurality of the first groups in conformity with a predetermined rule, and the first group is further divided into a plurality of the second groups in conformity with a predetermined rule,
wherein, the network address of at least one or more representative node devices are recorded in correspondence with the level information,
wherein, the control unit determines at least one representative node device belonging to each one of the second groups based on the level information in the routing table,
wherein, the control unit sends the information collection message to the one node device determined by the determining unit,
wherein the control unit receives the information collection message which is sent from the one node device determined by the control unit,
wherein, the control unit generates new response information based on received information sent by the determined node devices which received the information collection message, in the second groups, and
wherein, the control unit sends a return message including the new response information thus generated to other node device.

5. The node device according to claim 4,
wherein the control unit receives information collection message including a first group specification value indicative of the first level, and
the control unit changes the first group specification value included in the information collection message into a next group specification value indicative of the next level and sends the information collection message.

6. An information communication system including a plurality of node devices which mutually communicate through a network,
a first node device included in the information communication system comprising:
a first control unit that is configure to determine one representative node device belonging to first groups based on the level information in the routing table, and send an information collection message to the determined representative node device,
a second node device, which receives the information collection message thus sent, comprising:
a second control unit that is configured to (i) determine at least one representative node device belonging to each one of second groups based on the level information in the routing table, wherein the representative node device in the first group receives the information collection message (ii) send the received information collection message to the determined node device (iii) receive the information collection message which is sent from another node device in the overlay network; (iv) generate new response information based on received collection message; and (v) sent a return message including the new return information thus generated to the first node device,
wherein the first node device and the second node device includes a memory unit that memorizes a routing table which registers network address of at least one representative node device of the plurality of node devices connected to an overlay network configured by plurality of the node devices, and the second control unit generates the new response information from the response information of another node device in which the information collection message is received and the response information included in the return message returned from another node device thus determined within a predetermined time, wherein the return message is one received by the second node device and the information collection message includes a header section and a payload section, the header section including an IP address of another node device as a sending destination, payload section including identification information for identifying the message and main information including collection content.

7. An information collection method in an information communication system which includes a plurality of node devices which mutually communicate through a network, the method including the steps in a first node device and steps in a second node device, wherein the first node device and the second node device includes a memory unit that memorizes a routing table which registers network address of at least one representative node device of the plurality of node devices connected to an overlay network configured by the plurality of the node devices,
the steps in the first node device comprising:
determining one representative node device belonging to the first groups based on the information in the routing table; and
sending an information collection message to the determined representative node device;
the steps in the second node device comprising:
determining at least one representative node device belonging to each one of the second groups based on the level information in the routing table;
sending the received information collection message to the determined representative node devices belonging to the second groups;
receiving the information collection message which is sent from another node device in the overlay network;
generating new response information based on received collection message;
sending a return message including the new response information to a sending source of the collection message,
wherein the second node device generates the new response information from the response information of another node device in which the information collection message is received and the response information included in the return message returned from another node device thus determined within a predetermined time, wherein the return message is one received by the second node device and the information collection message includes a header section and a payload section, the header section including an IP address of another node device as a sending destination, payload section including identification information for identifying the message and main information including collection content.

8. A non-transitory computer-readable storage medium that stores a computer-executable program for a node device in an information communication system including a plurality of node devices which mutually communicate through a network, the program being installed in the node device, which includes a memory unit that memorizes a routing table which registers network address of at least one representative node device of the plurality of node devices connected to an overlay network configured by the plurality of the node devices, the program comprising instructions for:
determining one representative node device belonging to the first groups based on the level information in the routing table;
sending an information collection message to the determined representative node device; determining at least one representative node device belonging to each one of the second groups based on the level information in the routing table;
sending the received information collection message to the determined representative node devices belonging to the second groups;
receiving the information collection message which is sent from another node device in the overlay network;
generating new response information based on received collection message;
sending a return message including the new response information to a sending source of the collection message; and
receiving the return message including the response information, wherein the new response information is generated from the response information of another node device in which the information collection message is received and the response information included in the return message returned from another node device thus determined within a predetermined time, wherein the return message is one received and the information collection message includes a header section and a payload section, the header section including an IP address of another node device as a sending destination, payload section including identification information for identifying the message and main information including collection content.

* * * * *